(12) United States Patent
Kawasaki

(10) Patent No.: US 6,407,857 B2
(45) Date of Patent: Jun. 18, 2002

(54) LENS BARREL WITH VARIABLE EYEPOINT POSITION AND MICROSCOPE USING THE SAME LENS BARREL

(75) Inventor: Kenji Kawasaki, Musashimurayama (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/803,942

(22) Filed: Mar. 13, 2001

(30) Foreign Application Priority Data

Mar. 14, 2000 (JP) ........................................ 2000-076351

(51) Int. Cl.$^7$ ............................................... G02B 21/04
(52) U.S. Cl. ........................ 359/384; 359/368; 359/431
(58) Field of Search ................. 359/384, 368, 359/431, 434

(56) References Cited

U.S. PATENT DOCUMENTS 4,643,541 A * 2/1987 Matsubara ................... 359/384
5,519,531 A   5/1996 Sato
5,764,408 A * 6/1998 Otaki .......................... 359/368

FOREIGN PATENT DOCUMENTS

| JP | 4-166907 | 6/1992 |
|---|---|---|
| JP | 4-124218 | 11/1992 |
| JP | 5-53060 | 3/1993 |
| JP | 8-278448 | 10/1996 |
| JP | 9-73031 | 3/1997 |
| JP | 10-142473 | 5/1998 |

* cited by examiner

Primary Examiner—Jon Henry
(74) Attorney, Agent, or Firm—Pillsbury Winthrop LLP

(57) ABSTRACT

A lens barrel for microscope comprises a first optical system (G1), a second optical system (G2), and a third optical system (G3). The first optical system (G1) comprises a lens unit (G1L) which forms an intermediate image, a prism (P1), and deflecting mirrors (M1, M2). The second optical system (G2) comprises a deflecting mirror (M3) and a lens unit and converts an intermediate image by the lens unit (G1L) into a beam of parallel rays. The third optical system (G3) introduces the beam of parallel rays from the second optical system (G2) into an ocular. The deflecting mirror (M3) is configured to be turned around an axis normal to a center axis of the beam of rays from the first optical system (G1) and to a center axis of the beam of rays from the second optical system (G2) at the point P of intersection of these center axes. The horizontal distance from the optical axis of the objective to the eyepoint position, the eyepoint height, and the depression angle for observation are made variable by the lens barrel, so that a person of whatever build is allowed to perform observation with little fatigue in a natural posture.

16 Claims, 19 Drawing Sheets

Do=60mm, D1=0

Do=60mm, D1=45mm

Do=170mm, D1=0

Do=170mm, D1=45mm

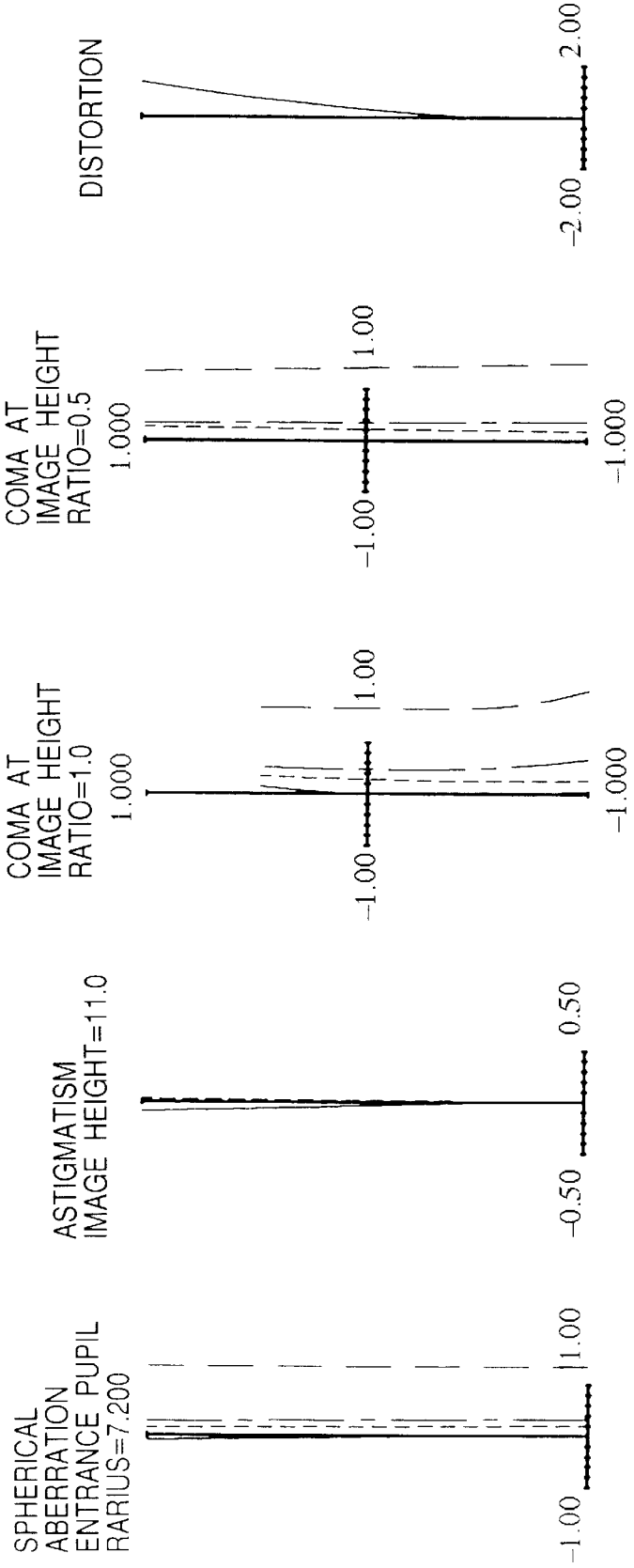

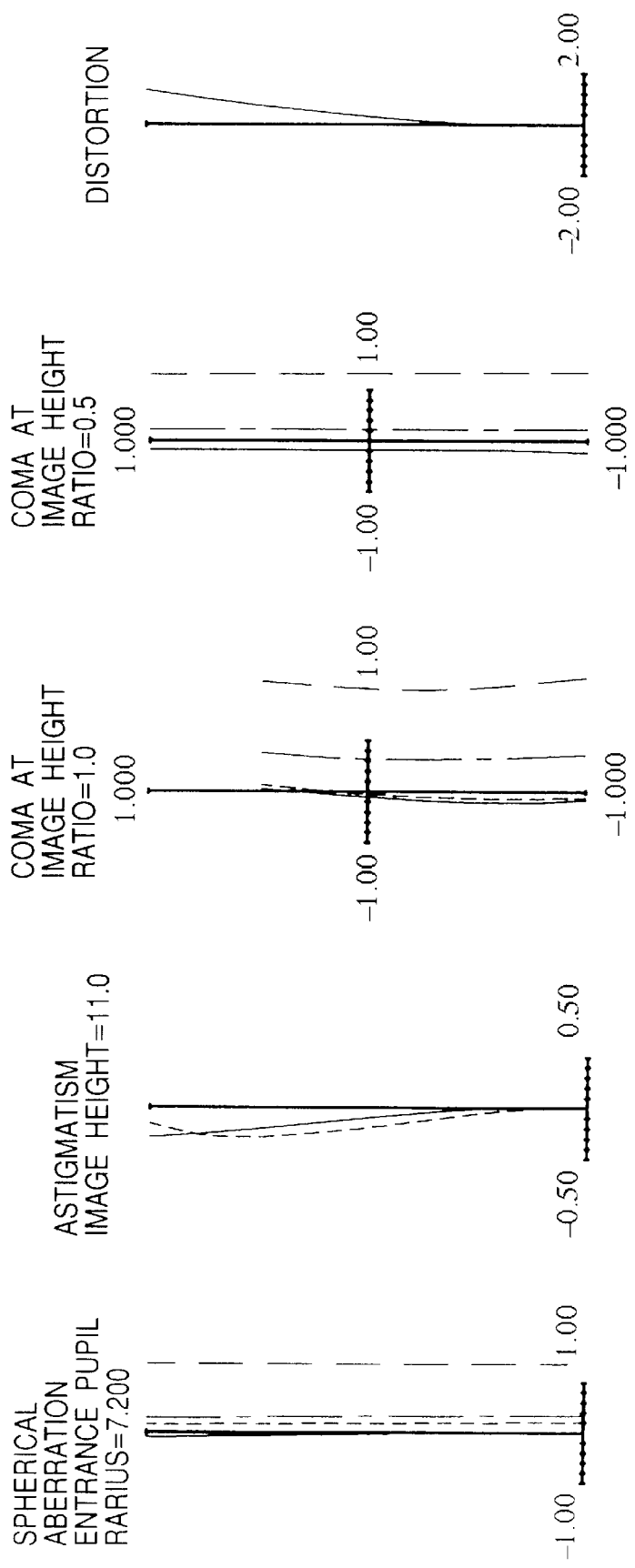

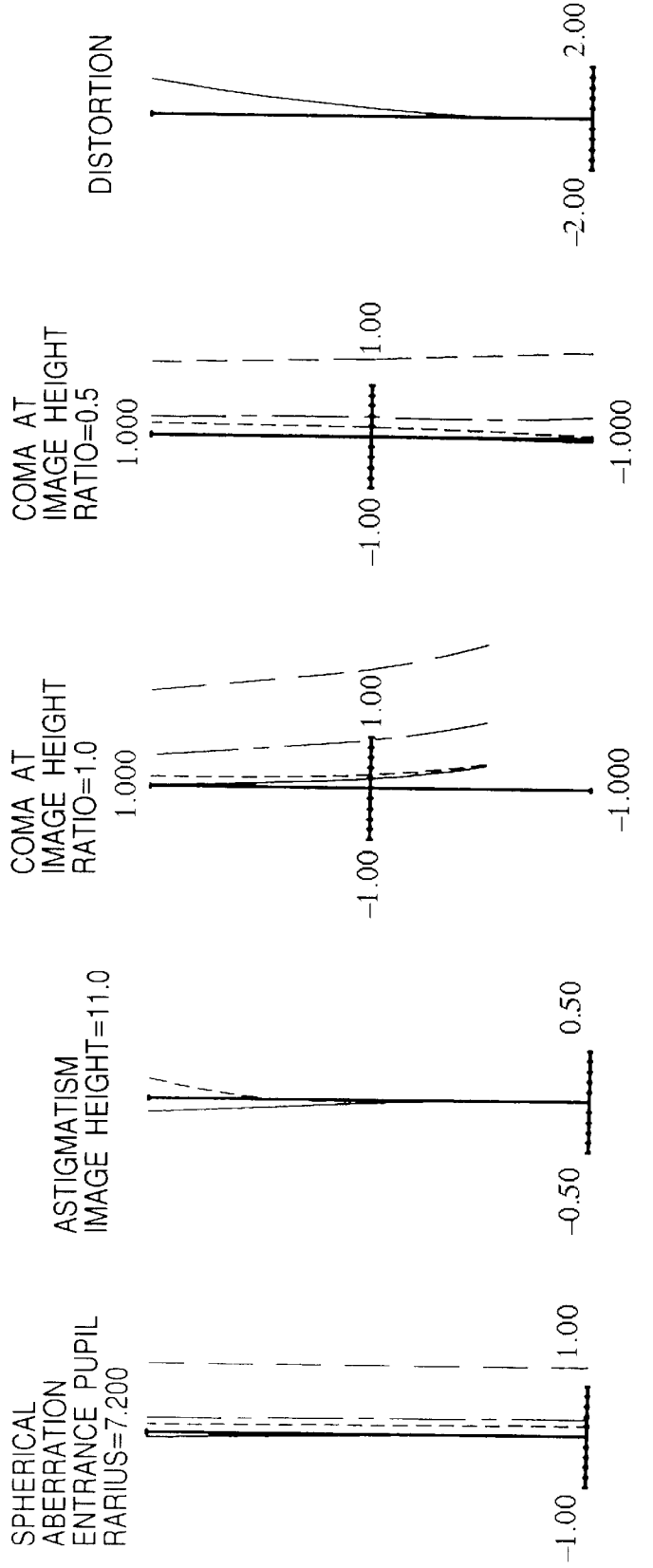

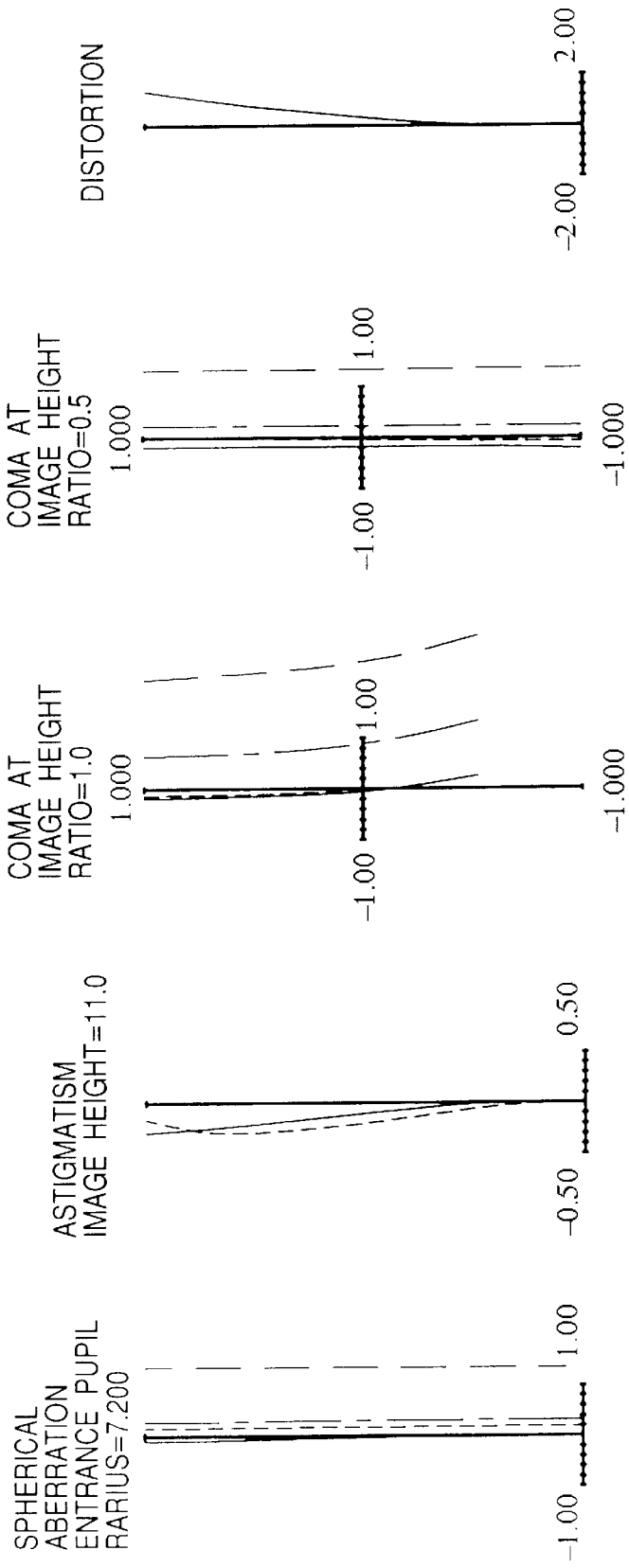

$D_0=60mm$, $D_1=0$ $D_0=60mm$, $D_1=45mm$ $D_0=170mm$, $D_1=0$ $D_0=170mm$, $D_1=45mm$

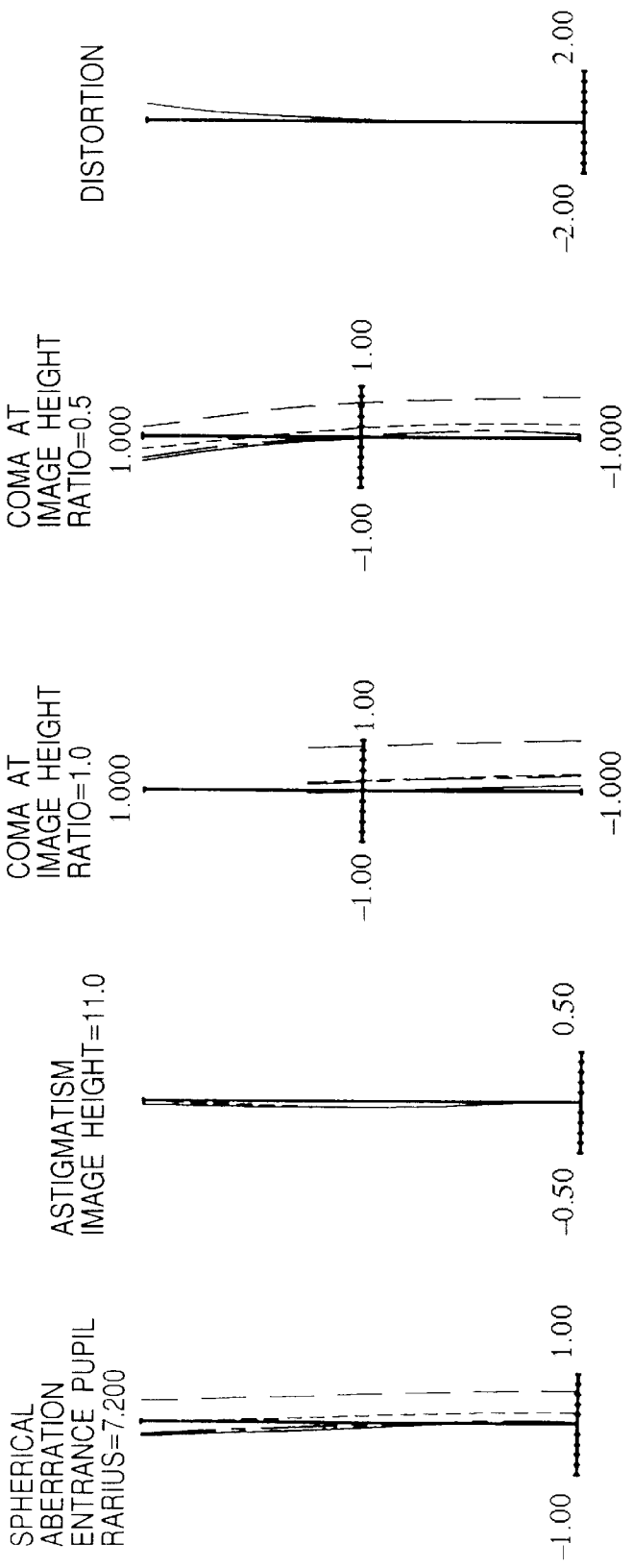

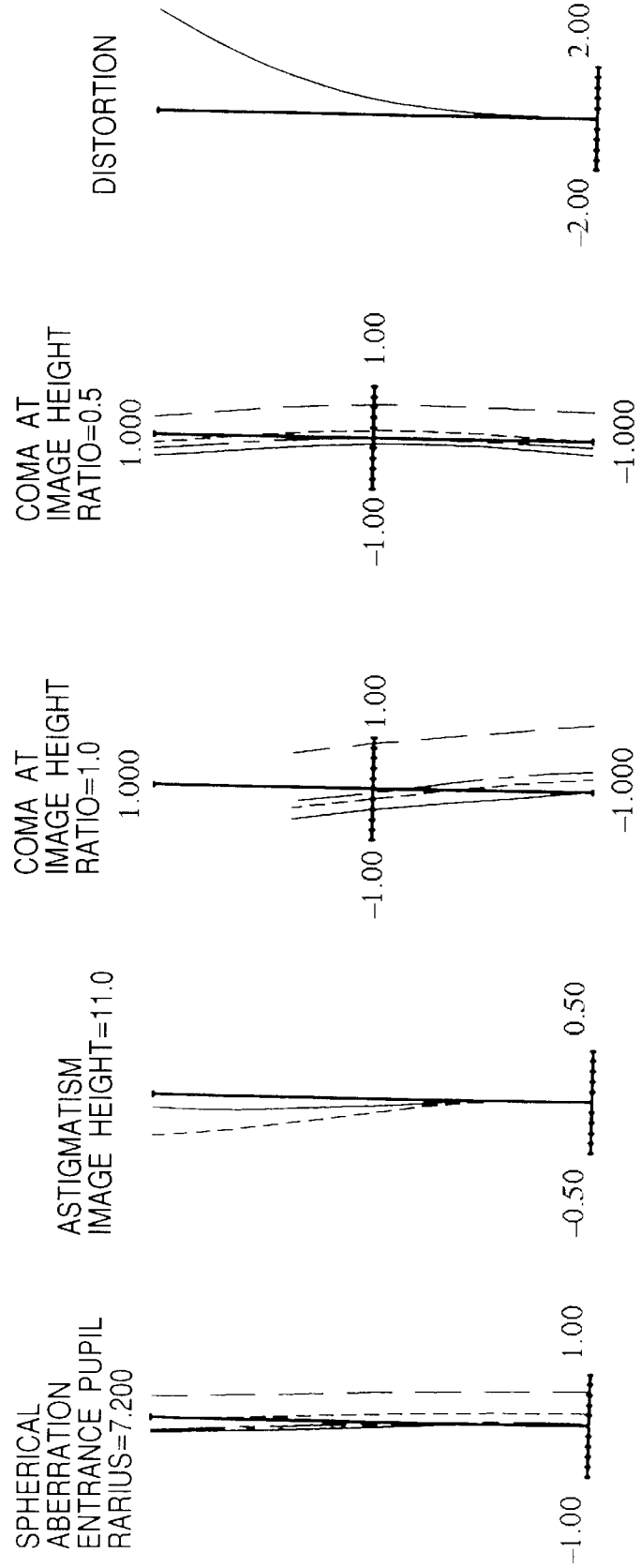

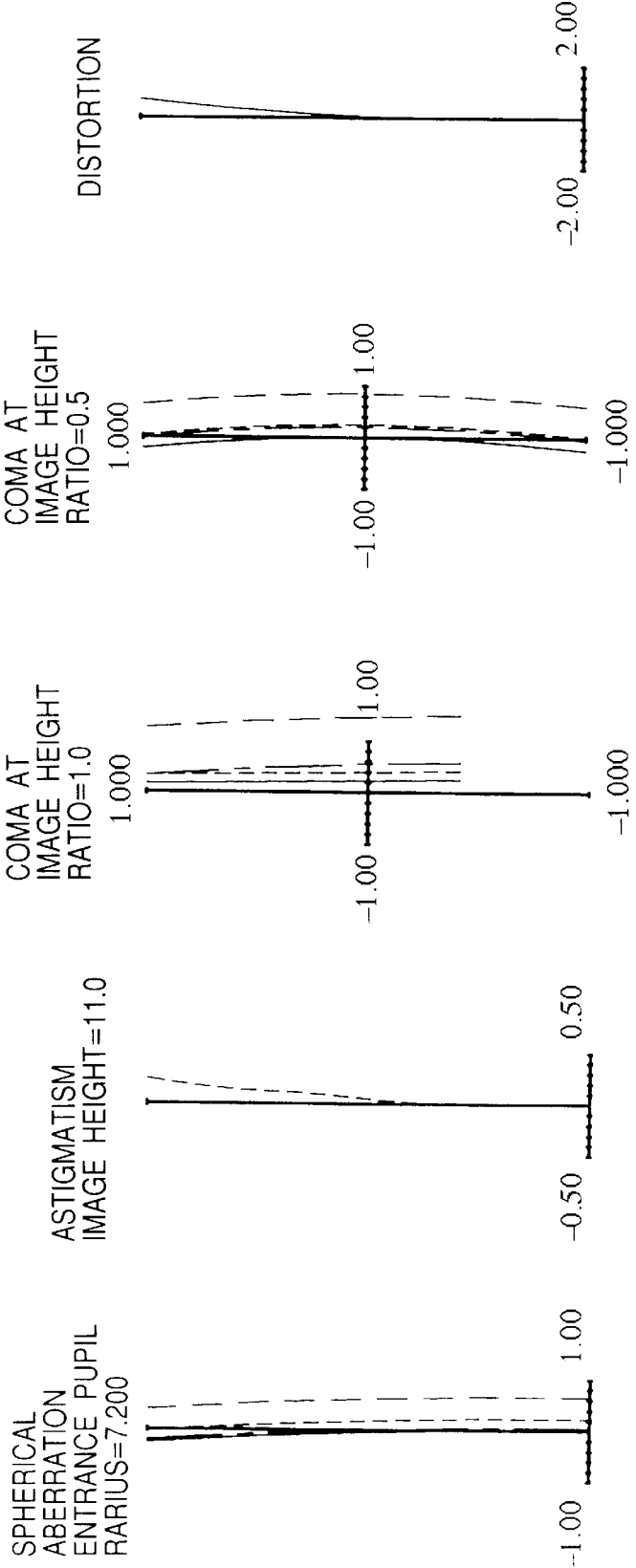

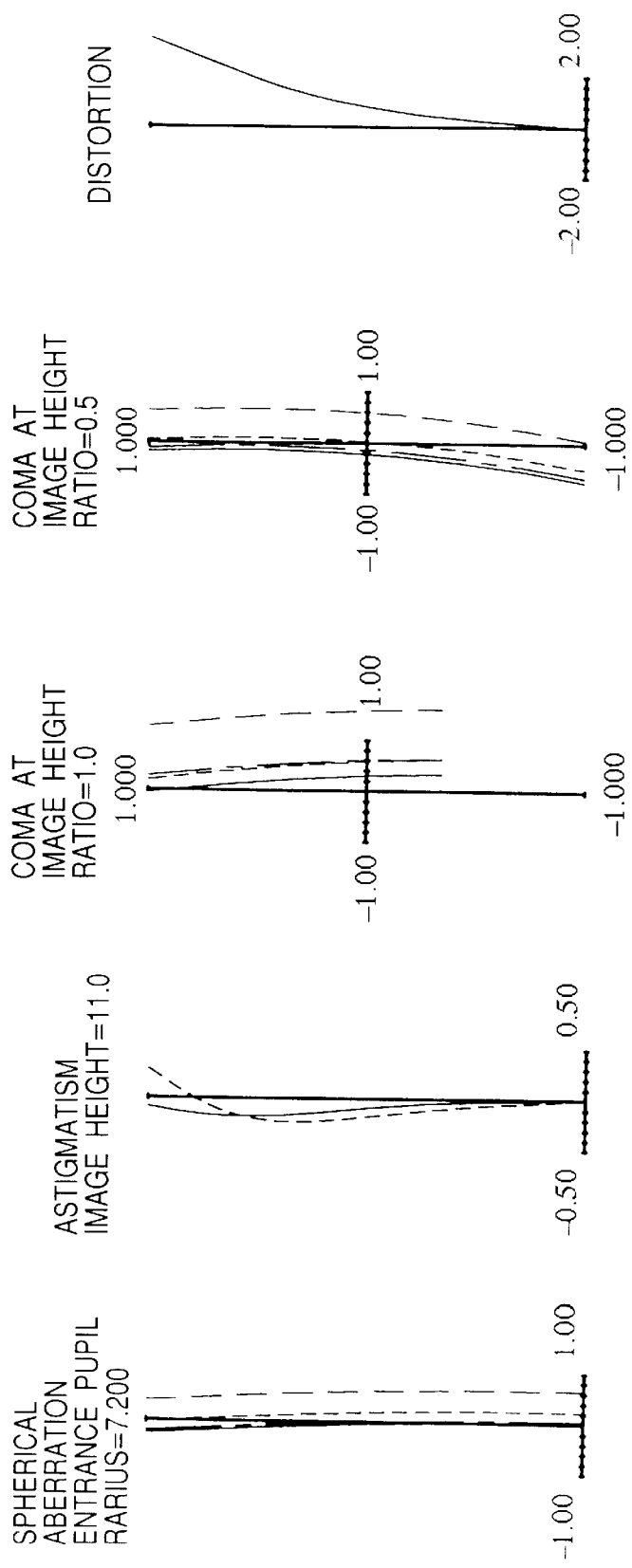

$D_0=60mm$, $D_1=0$ $D_0=60mm$, $D_1=45mm$ $D_0=170mm$, $D_1=0$ $D_0=170mm$, $D_1=45mm$

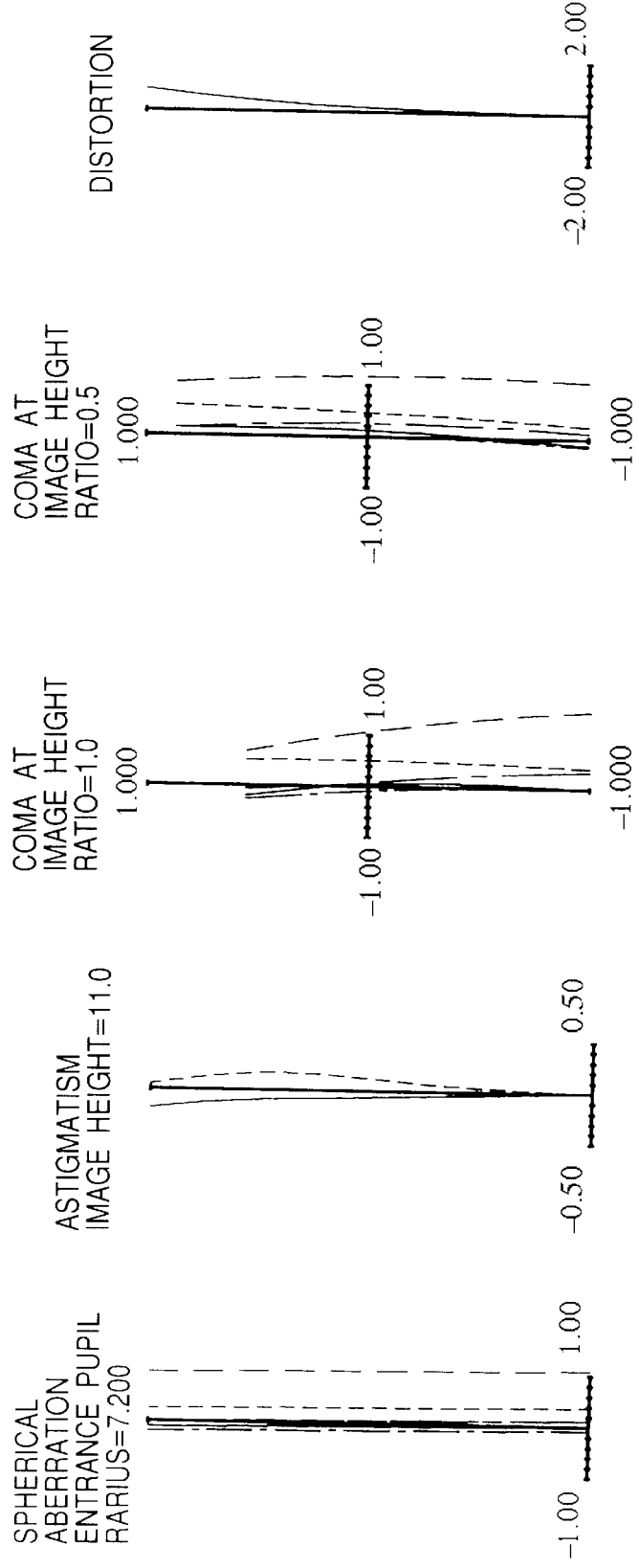

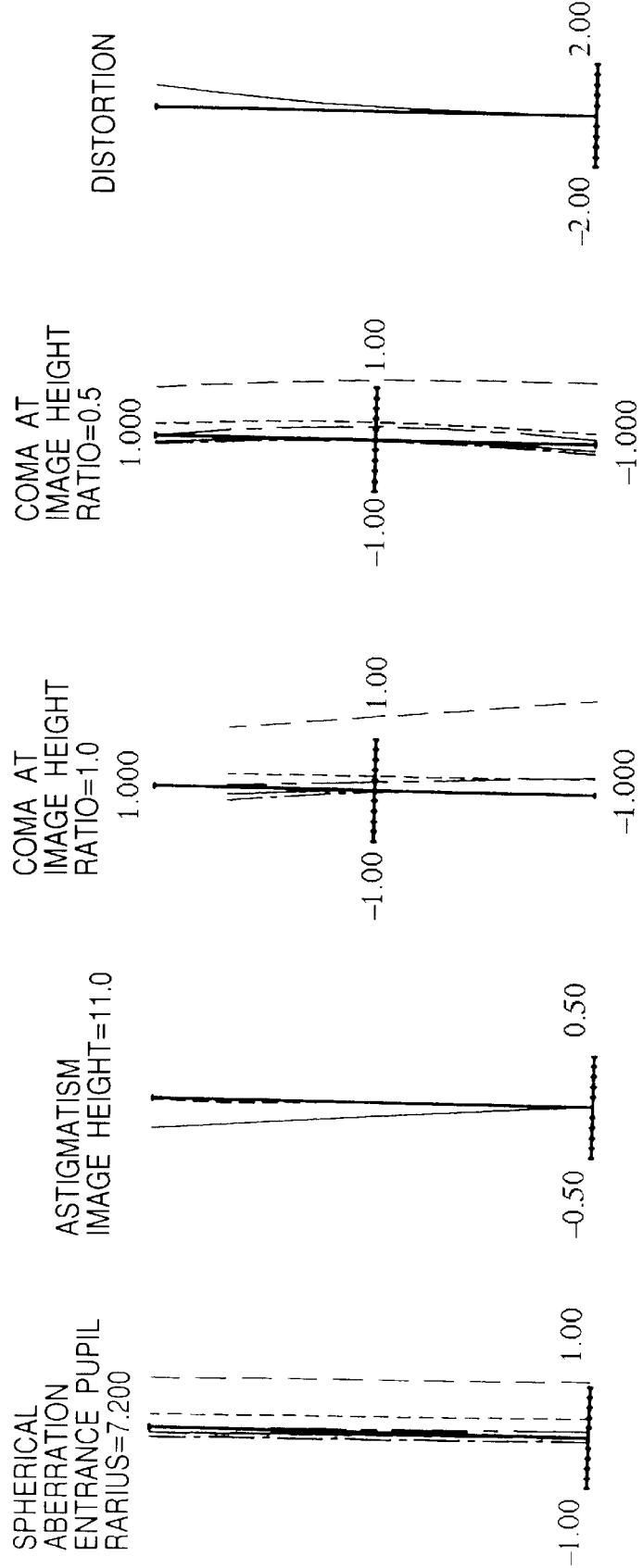

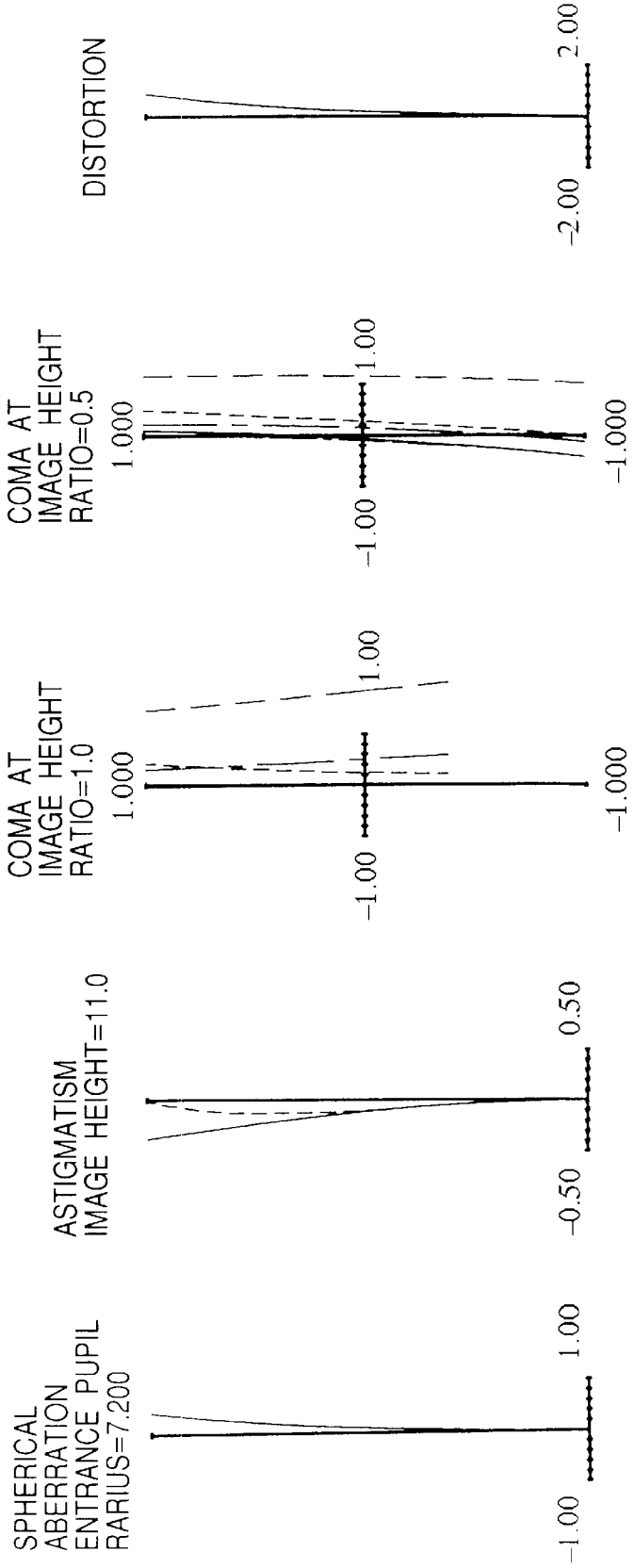

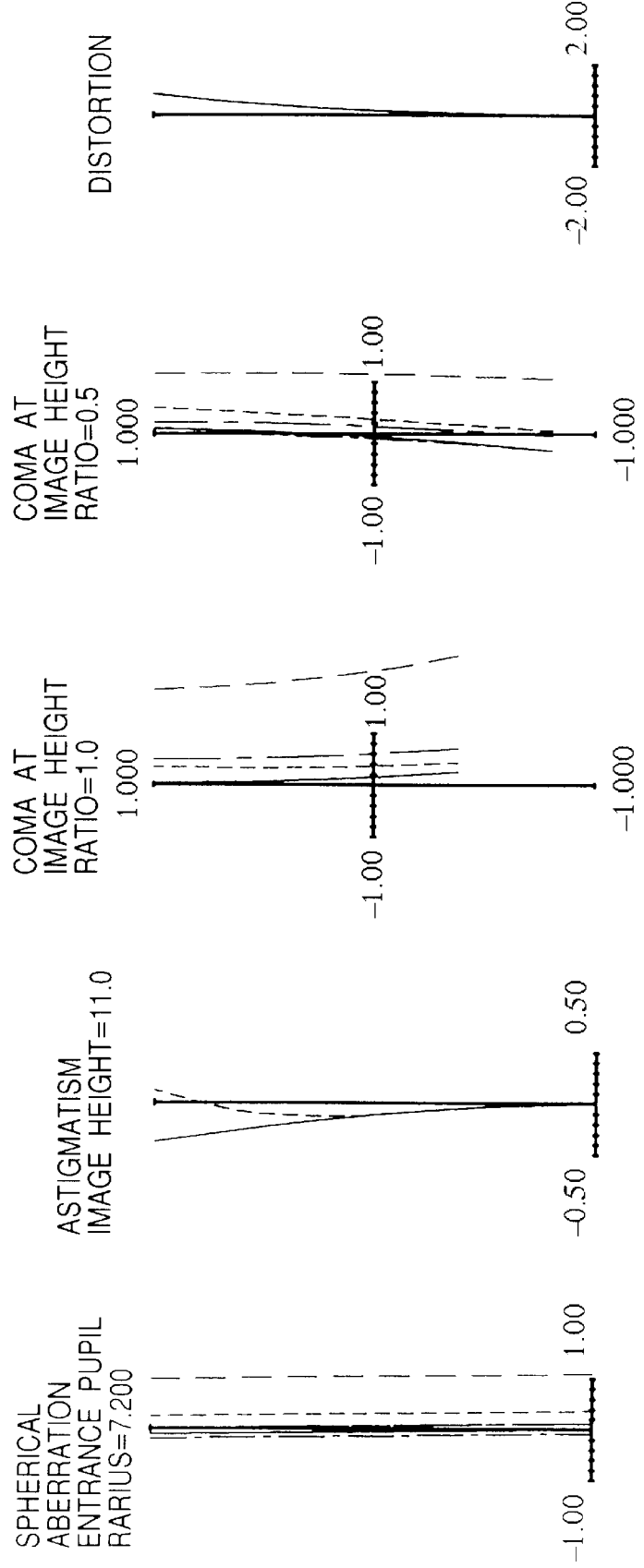

LENS BARREL WITH VARIABLE EYEPOINT POSITION AND MICROSCOPE USING THE SAME LENS BARREL

BACKGROUND OF THE INVENTION

1) Field of the Invention

The present invention relates to a lens barrel with variable eyepoint position and a microscope using the same lens barrel. Hereafter, this type of lens barrel will be simply referred to as "variable lens barrel".

2) Description of Related Art

Various proposals have been made for a lens barrel used in microscopy regarding adjustment of the position at which the ocular is looked into (i. e. eyepoint) so as to allow an observer to easily perform observation in relaxed posture.

For example, Japanese Patent Application Preliminary Publication (KOKAI) No. Hei 4-166907 proposes a tilting lens barrel which is provided with a mechanism for adjusting the depression angle, or the angle in which an observer looks into the ocular of the binocular section. This configuration is intended to adjust the height and position of the eyepoint by changing the depression angle.

Also, Japanese Patent Application Preliminary Publication (KOKAI) No. Hei 8-278448 proposes to lower the eyepoint position by deflecting a beam of rays emergent from the objective using a deflecting member. The object of this proposal is to allow an observer to perform observation in relaxed posture by preliminarily lowering the eyepoint position.

Also, Japanese Patent Application Preliminary Publication (KOKAI) No. Hei 10-142473 proposes a lens barrel that is provided with a tilting mechanism for changing the depression angle and a mechanism for moving it along the observation optical axis. The object of this proposal is to change each of the height of the eyepoint position and the horizontal distance from the optical axis of the objective to the position of the eye of an observer.

Also, Japanese Patent Application Preliminary Publication (KOKAI) No. Hei 9-73031 discloses a microscope comprising an optical system that is made afocal between an objective and an imaging lens, which is housed in a movable lens barrel. The afocal beam between the objective and the imaging lens is deflected in the horizontal direction by a first deflecting member and is further deflected by 90° by a second reflecting member, to enter the imaging lens. A guide is provided between the first deflecting member and the second reflecting member so that the second deflecting member and the movable lens barrel are integrally moved for changing the eyepoint position.

In microscopy, especially in the case where inspection of a large number of specimens or samples takes a long time, it is very important, for preventing fatigue of an observer/inspector and inaccurate inspection result caused by carelessness, to allow the observer to work in a relaxed posture. FIG. 22 shows the outer dimensions of an ordinary microscope. In order to relieve fatigue of each observer in the case where tall and large-built individuals and short and small-built individuals have to use a common microscope, it is important that values of 1) the height H from a desk top surface 2 to an eyepoint position E of an ocular OC, 2) the angle (depression angle) θ at which the observer looks into the ocular OC, and 3) the horizontal distance d from the optical axis of an objective OB to the eyepoint position E of the ocular are appropriately set for each observer. In order to allow an observer of whatever build to perform long-time observation in a natural posture, the eyepoint position E of the ocular OC is required to be at the eyes of the observer under the condition where the observer puts the hand on a focusing wheel 3 in a natural posture. Regarding an ordinary microscope, the height of the specimen surface 1 from the desk top surface 2 is 200 mm, and the height of a lens barrel 4-side mount position 8 of a microscope body 5 is 305 mm from the desk top surface 2. In FIG. 22, the reference numeral 6 and the reference numeral 7 represent a condenser lens and a stage control, respectively.

If a titling lens barrel proposed by Japanese Utility Model Application Preliminary Publication (UM-KOKAI) No. 4-124218 is combined with this microscope, the minimum height of the eyepoint position E from the desk top surface 2 is approximately 400 mm. Also, since the tilting lens barrel can change the depression angle θ, the height from the desk top surface 2 is variable approximately in a range from 400 mm to 500 mm. Also, the distance from the optical axis of the objective OB to the center position of the focusing wheel 3 is approximately 100 mm. In the case of an ordinary lens barrel, the eyepoint position E is distant from the optical axis of the objective OB approximately by 195 mm. In the case of a tilting lens barrel, which can change the depression angle θ, the horizontal distance is variable approximately in a range from 140 mm to 195 mm.

If the depression angle θ is changed using the above-mentioned tilting lens barrel, which simply changes the depression angle, the horizontal distance from the optical axis of the objective OB to the eyepoint position E is changed only by a small amount. However, the horizontal distance becomes shorter as the angle in reference to a horizontal plane is larger. This correlation makes it impossible to allow any observer of whatever build to perform observation in a natural posture. A tall and large-built person requires a longer horizontal distance from the optical axis of the objective and, as a matter of course, a higher eyepoint position than a short and small-built person does. For example, the optimum height of the eyepoint from the desk top surface 2 for a person of 1580 mm height is approximately 430 mm, whereas, for a person of 1840 mm height, the lowest necessary height of the eyepoint is approximately 510 mm from the desk top surface 2 and the optimum height of the eyepoint is approximately 600 mm from the desk top surface 2 on condition that the height of the desk top surface 2 from the floor is 70 cm and the height of a chair used during observation is appropriately adjusted. Therefore, even if the eyepoint height is adjusted to the maximum height using the conventional lens barrel 4, the person of 1840 mm height is obliged to keep an unnatural posture. In addition, the horizontal distance from the optical axis of the objective to the eyepoint also is too short, and, as a result, the posture of the observer looks as if he hunches over and hugs the microscope, to increase fatigue during observation, which is a problem. Also, even if an intermediate lens barrel is combined with the tilting lens barrel for adjustment of the eyepoint height, the eyepoint is allowed to be raised approximately by 60 mm at most, in effect. If the eyepoint is set higher than this limit, eclipse or short amount of marginal rays affects the image. As discussed above, use of the tilting lens barrel obliges a tall and large-built person to take an unnatural posture.

According to the lens barrel proposed by KOKAI No. Hei 10-142473, the depression angle and the eyepoint position are made variable independent of each other. However, in the lens arrangement of KOKAI No. Hei 10-142473, since a beam of rays from the objective is designed to be relayed to the focal plane of the ocular without imaging, a sufficiently long path length cannot be secured in the lens barrel. Therefore, it is substantially impossible to secure a sufficiently long horizontal distance from the objective to the eyepoint while providing a wide variable range of the eyepoint height for the above-mentioned adaptation of the microscope to variously built observers.

Also, within the scope of this conventional proposal, if the movable distance in the afocal section is designed to be long so as to allow the eyepoint position to be largely spaced away, the effective diameter through lenses and a binocular prism section becomes larger with degraded aberration performance by off-axial rays and the exit pupil position is largely displaced, to cause eclipse at the ocular.

Alternatively, if a design is made so that the afocal magnification of the first optical system and the second optical system is large and that the focal length of the third optical system is long for the purpose of spacing the eyepoint position away, the angle of an off-axial ray emergent from the second optical system becomes large, and, accordingly, the effective beam diameter becomes large in and after the third optical system, aberration performance on the margin is degraded, and inconsistency of the exit pupil position occurs.

Furthermore, in the case where a unit for reflecting illumination, a path dividing unit, a unit for raising the eyepoint position or the like is additionally arranged in the system, a beam diameter from the objective lens becomes large and accordingly effective beam diameter in the first optical system, the second optical system and the tilting mirror becomes large, to cause short amount of marginal rays or eclipse. Therefore, it is difficult to secure a long lens barrel length. If these optical systems are constructed to be large for adaptation to the large effective beam diameter, lenses cannot be arranged in a limited space.

To conclude, regarding the lens barrel proposed by KOKAI No. Hei 10-142473, it is difficult to secure a sufficient horizontal distance from the optical axis of the objective to the eyepoint position. Also, the movable distance of the third optical system using the afocal section is 30 mm at most. Therefore, it is difficult to allow variously built observers, especially tall and large-built persons, to take an optimum posture for observation. In addition, this prior example fails to disclose particular numerical data such as the height of the eyepoint position and the horizontal distance from the optical axis of the objective to the eyepoint position and thus its superiority to the conventional lens barrel at that time is not clear.

Similarly, according to the proposal of KOKAI No. 9-73031 also, since movable range of the lens unit for changing the length of the afocal beam of rays is physically limited, the eyepoint position cannot be changed so large as to be well adapted to variously built observers.

SUMMARY OF THE INVENTION

The present invention is made in consideration of the aforementioned problems of the conventional art. An object of the present invention is to provide a variable lens barrel which can change the horizontal distance from the optical axis of the objective to the eyepoint position, the height of the eyepoint, and the depression angle for observation so that a person of any build is able to perform observation in a natural posture causing little fatigue and which can achieve system compatibility with intermediate lens barrels etc. The present invention is directed to a microscope using such a variable lens barrel, also.

In order to attain the above-mentioned objects, a lens barrel according to the present invention comprises, in order from the light incident side, a first optical system, a second optical system which converts a beam of rays emergent from the first optical system into a parallel beam of rays, and a third optical system which introduces the beam of parallel rays emergent from the second optical system into an ocular. The first optical system includes a lens unit which forms an intermediate image and at least three light deflecting members which deflect the beam of rays. The second optical system includes a lens unit and a light deflecting member. The light deflecting member of the second optical system is constructed and arranged to turn around an axis that is perpendicular to a first optical axis and a second optical axis, where the center axis of the beam of rays emergent from the most second optical system-side one of the light deflecting members of the first optical system in optical arrangement is defined as the first optical axis, and the center axis of the beam of parallel rays emergent from the second optical system is defined as the second optical axis.

According to this configuration, an intermediate image is formed by the first optical system, is re-imaged by the second optical system and the third optical system at the focal plane of the ocular, and is observed. For image observation via the ocular without eclipse, the entrance pupil position of the ocular is required to substantially coincide with the exit pupil position of the lens barrel. For this arrangement, it is necessary to form an afocal system with the second optical system and the third optical system. Under this condition, if each lens unit of the second optical system and the third optical system is constructed with a cemented lens, separation as much as F2+F3 is required between the second optical system and the third optical system, where the focal length of the second optical system is F2 and the focal length of the third optical system is F3. Also, since the intermediate image by the first optical system is converted into a beam of parallel rays, if the lens unit of the first optical system is constructed of a single lens, the separation between the first optical system and the second optical system becomes F1+F2, where the focal length of the first optical system is F1.

In this way, the configuration in which an intermediate image is formed inside the lens barrel can secure a sufficiently long path length of the optical systems arranged in the lens barrel in comparison with a configuration without an intermediate image. Accordingly, a wide variety of options are available regarding the path layout inside the lens barrel, and thus higher flexibility is assured in eyepoint position setting.

Also, since at least three optical members and, in addition, an optical member that it to turn freely are arranged in the lens barrel for deflecting the beam of rays, the beam of rays are deflected four times inside the lens barrel, to allow observation of a correctly erected image. Also, revolving movement of the light deflecting member of the second optical system, the rear section of the second optical system arranged behind the light deflecting member of the second optical system, the third optical system and the ocular allows adjustment of the depression angle for observation.

Also, according to the present invention, the lens barrel is constructed and arranged so that, when the light deflecting member of the second optical system is turned by an angle of $\alpha$, a rear section of the second optical system disposed behind the light deflecting member of the second optical system, the third optical system and the ocular are integrally revolved by an angle of $2\alpha$.

According to this configuration, since the axis of the beam of rays emergent from the light deflecting member of the second optical system and the optical axis of the ocular always coincide, correction of the depression angle in accordance with turn of the light deflecting member is dispensable, to provide a highly operable microscope.

Also, according to the present invention, the lens barrel is constructed and arranged so that the separation between the second optical system and the third optical system is variable along the optical axis.

According to this configuration, it is possible to change the eyepoint position by integrally moving the third optical system and the ocular in the direction of the optical axis of the third optical system. Also, as described above, the depression angle, at which an observer looks into the ocular, can be changed by revolving movement of the light deflecting member of the second optical system. Therefore, combination of these features allows the eyepoint position to be changed in height and in distance from the optical axis of the objective.

Also, a lens barrel according to the present invention comprises, in order from the light incident side, a first optical system, a second optical system which converts a beam of rays emergent from the first optical system into a beam of parallel rays, and a third optical system which introduces the beam of parallel rays emergent from the second optical system into an ocular. The first optical system comprises a lens unit which forms an intermediate image and at least four light deflecting members which deflect the beam of rays. The separation between the second optical system and the third optical system is variable in a direction along the center axis of the beam of rays emergent from the second optical system.

According to this configuration, as in the aforementioned configuration, the intermediate image is formed by the first optical system, is re-imaged by the second optical system and the third optical system at the focal plane of the ocular, and is observed. In this way, the configuration in which the intermediate image is formed inside the lens barrel can secure a sufficiently long path length of the optical systems arranged in the lens barrel in comparison with a configuration without an intermediate image. Accordingly, a wide variety of options are available regarding the path layout inside the lens barrel, and thus higher flexibility is assured in eyepoint position setting.

Also, in the lens barrel, at least four optical members and, in addition, an optical member that it to turn freely are constructed and arranged to deflect the beam of rays six times inside the lens barrel, so that a correctly erect image can be observed.

Furthermore, since the lens barrel is designed so that the beam of rays traveling between the second optical system and the third optical system is parallel, the imaging performance and the image position do not change even if the separation between the second optical system and the third optical system is changed. Accordingly, the third optical system and the ocular are allowed to integrally move in the direction of the optical axis of the third optical system and thus the eyepoint position can be changed.

Also, according to the present invention, the third optical system comprises, in order from the side of the second optical system, a first lens unit having a positive refracting power, a second lens unit having a negative refracting power, and a third lens unit having a positive refracting power.

According to this configuration, since the separation between the second optical system and the third optical system is allowed to be shorter than in a configuration where the third optical system is composed of a single lens (which may be a cemented lens) and accordingly the pupil position of the ocular can be set closer to the third optical system, a conventional ocular is commonly usable or eclipse at the ocular is avoidable.

As will be described later in the first embodiment, in a configuration where the third optical system is composed of a single cemented lens, if the separation between the second optical system and the third optical system is short, the pupil position at the focal plane of the ocular comes closer to the ocular. As a result, such a phenomenon as limits the optical performance of the ocular, e.g., increase in effective diameter of the ocular, eclipse on the margin, takes place. In addition, since a large separation is necessary between the second optical system and the third optical system, the path length of the entire system becomes long, to cause bulkiness of the lens barrel itself. In contrast, in the above-mentioned configuration where the third optical system is composed of three lens units of positive-negative-positive, a path length (space) to accommodate the prism section can be secured in the lens barrel. Furthermore, this configuration can reduce change of the entrance pupil position on the side of the objective, which would be caused by use in combination with an intermediate lens barrel, and fluctuation of the exit pupil, which would be caused in accordance with integral movement of the third optical system through the ocular. Also, eclipse or short amount of marginal rays can be prevented without increase in the effective diameter of each lens arranged in the third optical system through the ocular. In addition, since the total path length can be shortened, compact sizing of the entire lens barrel can be realized.

Also, in the third optical system of the present invention, the first lens unit comprises at least one positive meniscus lens which directs a concave surface thereof toward the second lens unit, and the third lens unit comprises at least one positive meniscus lens which directs a concave surface thereof toward the second lens unit.

This configuration can well reduce generation of aberrations caused by off-axial rays and can maintain the performance in good condition regarding off-axial aberrations, which would be affected by fluctuation of the exit pupil position in accordance with the integral movement of the third optical system through the ocular.

Also, the lens barrel according to the present invention is constructed and arranged to satisfy the condition:

$$0.7 \leq F1/F \leq 1.4$$

where F1 is the focal length of the first optical system, and F is the focal length of the entire system from the first optical system through the third optical system.

According to this configuration, The lens barrel can be made compact, without increase in lens diameter or unnecessary prolongation of the path length inside the lens barrel. Furthermore, the horizontal distance from the optical axis of the objective to the eyepoint position can be set long. Furthermore, regarding the eyepoint height, it can be set higher than in the case of the conventional lens barrel. Furthermore, combination with the above-mentioned configuration in which the third optical system through the ocular are integrally movable allows the horizontal distance from the optical axis of the objective to the eyepoint position to be largely changed and allows the depression angle also to be changed. As a result, the eyepoint position can be set more flexibly in a wider range and thus the observer of whatever build can take an ideal posture for observation.

If F1/F falls below the lower limit of the condition in the case where the value of the focal length F2 of the second optical system is larger than F1, the focal length F3 (=(F2/F1)×F) of the third optical system becomes longer than F and accordingly the length from the third lens unit to the ocular becomes long. Under this condition, since the eyepoint position is too distant from the optical axis of the objective, appropriate posture for observation cannot be taken. In the case where the value of F2 is smaller than F1, while the path length can be made short, aberrations cannot be compensated in good condition or a field lens for adjustment of the pupil position is necessitated, to result in increase in number of lenses and accordingly cost rise of the products.

Also, if an intermediate lens barrel is interposed between the infinity distance correcting objective and the lens barrel, to widen the separation between, eclipse or degradation of the off-axial aberration performance would be caused. Therefore, too small value of F1/F is not preferable in view of system compatibility also.

If F1/F exceeds the upper limit of the condition in the case where the value of F2 is smaller than F1, F3 also becomes small, and accordingly a sufficient path length cannot be secured in the binocular section as to accommodate the prisms. Also, the lens diameter of the third optical system and the prism size of the binocular section are obliged to be large. As a result, the parts used in the lens barrel cannot be standardized with the parts of the conventional binocular section, to raise cost of the products. Also, under the condition where the separation between the infinity distance correcting objective and the lens barrel is small, the pupil position is not properly located and thus eclipse or degradation of aberration performance on the margin occurs. Therefore, too large value of F1/F is not preferable.

Also, the lens barrel according to the present invention is configured to satisfy the following condition:

$$0.5 \leq F3/F \leq 1$$

where F3 is the focal length of the third optical system.

This configuration allows aberrations to be compensated in good condition. Therefore, eclipse of the field or short amount of light on the margin resulting from shift of the pupil position less occurs even if the pupil position is changed in accordance with integral movement of the third optical system through the ocular or with interposition of an intermediate lens barrel unit between the objective and the lens barrel. Also, layout of the path of rays in the lens barrel can be made compact and the eyepoint can be set at a position more distant than in the case of the conventional lens barrel. Therefore, this configuration is preferable.

If F3/F falls below the lower limit of the condition, the path length in the lens barrel becomes extremely long to cause bulkiness of the lens barrel or, alternatively, F3 is made short and accordingly a sufficient path length cannot be secured between the third optical system and the ocular. Also, the pupil position cannot substantially coincide with the entrance pupil position of the ocular and accordingly eclipse or degradation of off-axial aberration performance is caused.

If F3/F exceeds the upper limit of the condition, since the F3 is long and accordingly the path length from the third optical system to the ocular becomes long, the eyepoint position is too distant from the optical axis of the objective, and, in addition, the total path length also becomes long, to result in bulkiness of the lens barrel. Therefore, too large value of F3/F is not preferable. Also, since the pupil position cannot substantially coincide with the entrance pupil position of the ocular, unfavorable phenomenon such as eclipse or degradation of off-axial aberration performance occurs as in the case where F3/F is below the lower limit.

This and other objects as well as features and advantages of the present invention will become apparent from the following detailed description of the preferred embodiments when taken in conjunction with the accompanying drawings.

BRIEF DESCRIPTION OF THE DRAWINGS

FIG. 7A shows the case where $D_0=60$ mm and $D_1=0$, FIG. 7B shows the case where $D_0=60$ mm and $D_1=45$ mm, FIG. 7C shows the case where $D_0=170$ mm and $D_1=0$, and FIG. 7D shows the case where $D_0=170$ mm and $D_1=45$ mm.

FIGS. 8A–8E are aberration diagrams showing aberration performance at the ocular in the condition of FIG. 7A of the third embodiment.

FIGS. 9A–9E are aberration diagrams showing aberration performance at the ocular in the condition of FIG. 7B of the third embodiment.

FIGS. 10A–10E are aberration diagrams showing aberration performance at the ocular in the condition of FIG. 7C of the third embodiment.

FIGS. 11A–11E are aberration diagrams showing aberration performance at the ocular in the condition of FIG. 7D of the third embodiment.

FIG. 12A shows the case where $D_0=60$ mm and $D_1=0$, FIG. 12B shows the case where $D_0=60$ mm and $D_1=45$ mm, FIG. 12C shows the case where $D_0=170$ mm and $D_1=0$, and FIG. 12D shows the case where $D_0=170$ mm and $D_1=45$ mm.

FIGS. 13A–13E are aberration diagrams showing aberration performance at the ocular in the condition of FIG. 12A of the fourth embodiment.

FIGS. 14A–14E are aberration diagrams showing aberration performance at the ocular in the condition of FIG. 12B of the fourth embodiment.

FIGS. 15A–15E are aberration diagrams showing aberration performance at the ocular in the condition of FIG. 12C of the fourth embodiment.

FIGS. 16A–16E are aberration diagrams showing aberration performance at the ocular in the condition of FIG. 12D of the fourth embodiment.

FIG. 17A shows the case where $D_0=60$ mm and $D_1=0$, FIG. 17B shows the case where $D_0=60$ mm and $D_1=45$ mm, FIG. 17C shows the case where $D_0=170$ mm and $D_1=0$, and FIG. 17D shows the case where $D_0=170$ mm and $D_1=45$ mm.

FIGS. 18A–18E are aberration diagrams showing aberration performance at the ocular in the condition of FIG. 17A of the fifth embodiment.

FIGS. 19A–19E are aberration diagrams showing aberration performance at the ocular in the condition of FIG. 17B of the fifth embodiment.

FIGS. 20A–20E are aberration diagrams showing aberration performance at the ocular in the condition of FIG. 17C of the fifth embodiment.

FIGS. 21A–21E are aberration diagrams showing aberration performance at the ocular in the condition of FIG. 17D of the fifth embodiment.

DETAILED DESCRIPTION OF THE PREFERRED EMBODIMENTS

First Embodiment

Figure 1:
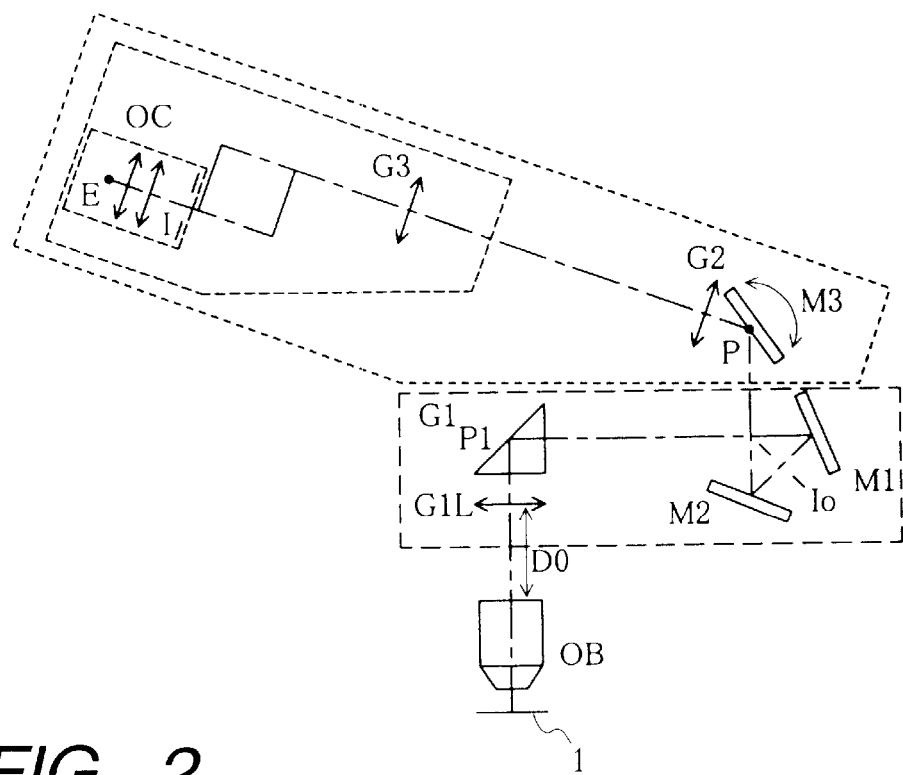
FIG. 1 shows the configuration of a variable lens barrel according to the first embodiment of the present invention.

In reference FIG. 1, description will be made of the first embodiment of the variable lens barrel according to the present invention. According to this embodiment, light from the specimen surface 1 is converted into an infinite distance beam of rays by an infinite distance correcting objective OB and is observed via a variable lens barrel and an ocular OC. The variable lens barrel comprises, in order from the side of the objective OB, a first optical system G1, a second optical system G2, and a third optical system G3. The first optical system comprises a first lens unit G1L which converges the beam of rays from the objective OB, a prism P1 which deflects the beam of rays from the first lens unit G1L by 90° so that the beam of rays travels horizontal and away from an observer (or the ocular OC), and deflecting mirrors M1, M2 which deflect the beam of rays from the prism P1 by 90° by reflecting it twice so that the beam of rays emerges in a vertical direction. The second optical system G2 comprises a turnable deflecting mirror M3 which deflects the beam of rays from the deflecting mirror M2 toward the observer and a lens unit which converts an intermediate image formed by the first lens unit G1L into a beam of parallel rays. The third optical system G3 re-images the intermediate image. The re-formed image is observed via the ocular OC. A binocular section including a prism section is not shown in the figure. The turnable deflecting mirror M3 is constructed and arranged to turn around an axis that passes an intersection P of a first optical axis and a second optical axis and that is perpendicular to a plane on which the deflecting mirror M2 and the second optical axis lie, where a center axis of the beam of rays emergent from the deflecting mirror M2 is defined as the first optical axis, and a center axis of the beam of rays emergent from the second optical system G2 is defined as the second optical axis. The rear section of the second optical system G2, or the lens unit of the second optical system G2 disposed behind the deflecting mirror M3, the third optical system G3, the binocular section and the ocular OC are constructed and arranged to revolve around the point P.

Since the first embodiment is thus configured, the beam of the rays from the objective OB is converged by the first lens unit G1L, deflected by the prism P1 in the horizontal direction, and is deflected by the two deflecting mirrors M1, M2 in the vertical direction. The intermediate image IO is formed by the first lens unit G1L between the deflecting mirrors M1 and M2. The intermediate image IO is converted into the beam of parallel rays by the second optical system G2 and re-imaged by the third optical system G3 at the focal position I of the ocular OC. In this configuration, if the rear section of the second optical system G2, the third optical system G3, the binocular section and the ocular OC are integrally revolved about the axis that is perpendicular to the plane on which the first optical axis and the second optical axis lie and that passes the point P, the depression angle for observation is adjusted by the mirror M3. Also, if the lens barrel is configured so that the rear section of the second optical system G2, the third optical system G3, the binocular section and the ocular OC are integrally revolved by an angle $2\alpha$ in accordance with turn of the deflecting mirror M3 by an angle $\alpha$, observation can be performed without shift of the center position of the observation field.

In the configuration where an intermediate image is formed inside the lens barrel in this way, since the path length can be secured sufficiently long in the lens barrel, the position of the point P can be substantially freely set upon appropriate setting of the positions of the four deflecting members, i. e. the three deflecting members (the prism P1 and the deflecting mirrors M1, M2) of the first optical system G1 and the deflecting mirror M3 of the second optical system G2. Accordingly, the horizontal distance of the eyepoint from the optical axis of the objective OB or from the center of the focusing wheel 3 and the eyepoint height (i. e. the eyepoint position E) can be appropriately adjusted.

Also, since at least three optical members and, in addition, an optical member that is to turn freely are arranged in the lens barrel for deflecting the beam of rays, reflection occurs four times inside the lens barrel while relay of the intermediate image takes place only once, to allow observation of a correctly erected image. Also, in accordance with the turn of the deflecting mirror M3 around the point P, the rear section of the second optical system G2, the third optical system G3, the binocular section and the ocular OC are integrally revolved around the point P to achieve flexible adjustment of the depression angle for observation. Therefore, the eyepoint height is freely changeable. In this way, if the configuration of the present invention is employed, more appropriate setting of the eyepoint position is realized in comparison with the conventional tilting lens barrel. Adjustment of the eyepoint position E can be made also by changing the separation $d_0$ from the infinite distance correcting objective OB to the first lens unit G1L by means of insertion and removal of an intermediate lens barrel unit or the like.

Second Embodiment

Figure 2:
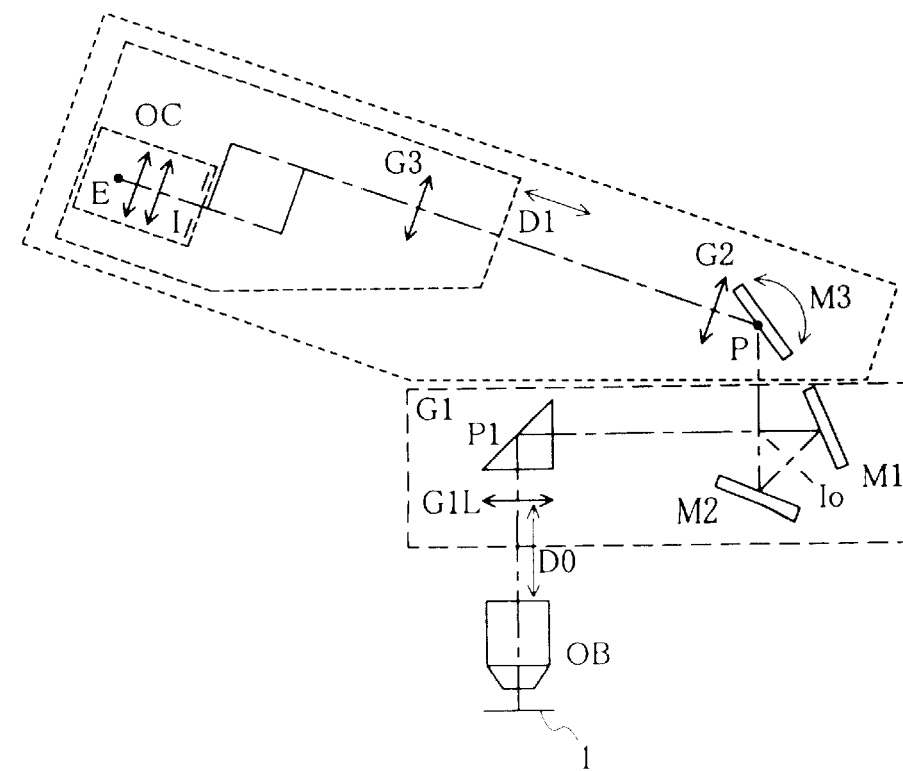
FIG. 2 shows the configuration of a variable lens barrel according to the second embodiment of the present invention.

In reference to FIG. 2, description will be made of the variable lens barrel according to the second embodiment of the present invention. This embodiment differs from the first embodiment in that the separation between the second optical system G2 and the third optical system G3 is changeable. The substantially same members as in the first embodiment are represented by the same reference symbols and explanation is omitted here regarding the same structure and function as in the first embodiment. In this embodiment, the third optical system G3, the binocular section and the ocular OC are integrally shifted in the direction along the second optical axis to change the separation $D_1$ between the second optical system G2 and the third optical system G3. Since the second optical system G2 through the third optical system G3 are made afocal, the eyepoint position E can be changed without change of the image position or the magnification even if the third optical system G3 performs the above-mentioned movement. Therefore, according to this embodiment, the horizontal distance from the eyepoint position E to the optical axis of the objective or to the focusing wheel 3 and the eyepoint height are flexibly adjustable by means of integral shift of the third optical system G3, the binocular section and the ocular OC for adaptation to the build of the observer, in addition to the change of the eyepoint position by means of the same operation as in the first embodiment.

Figure 3:
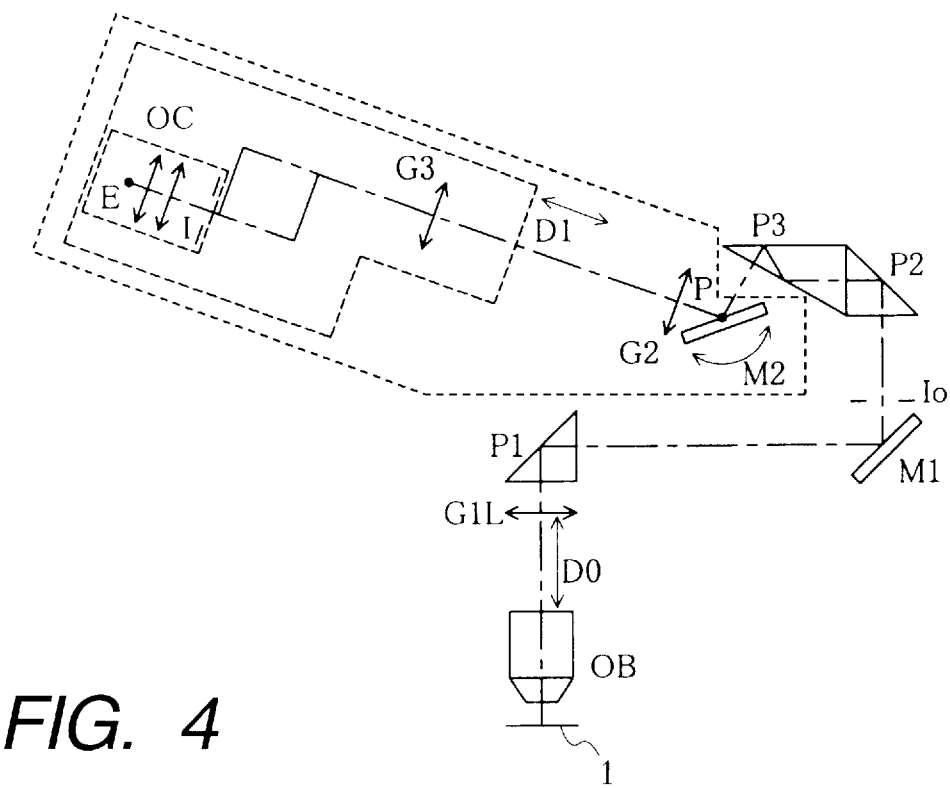
FIG. 3 shows the configuration of a modification example of the second embodiment.
Figure 4:
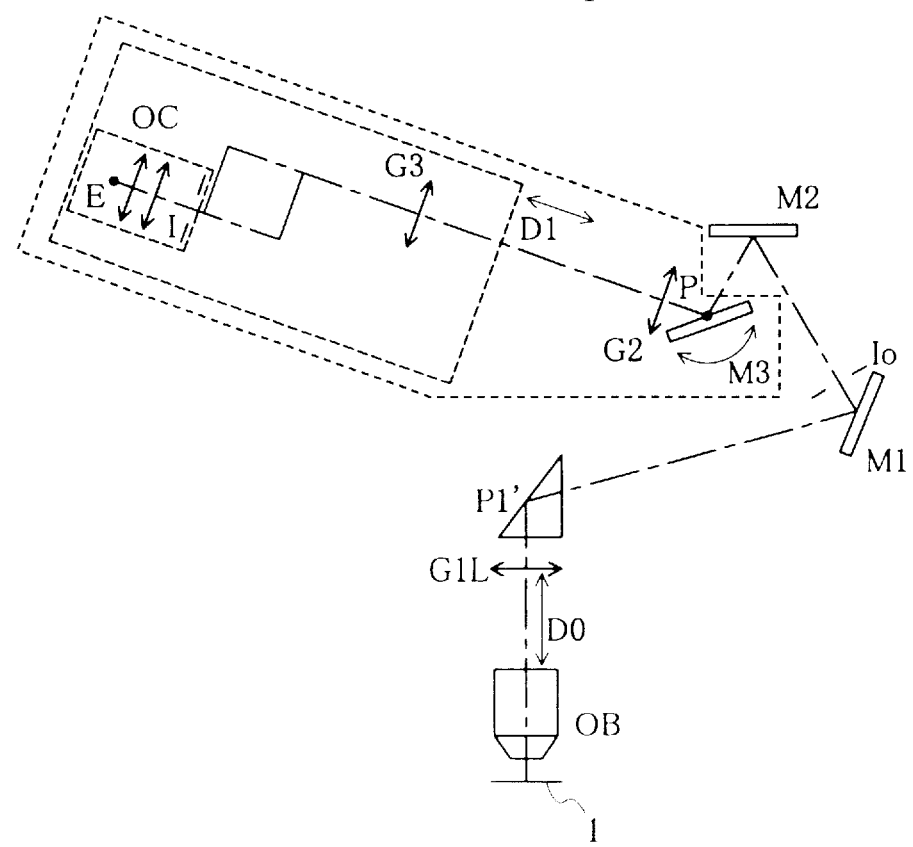
FIG. 4 shows the configuration of another modification example of the second embodiment.
Figure 5:
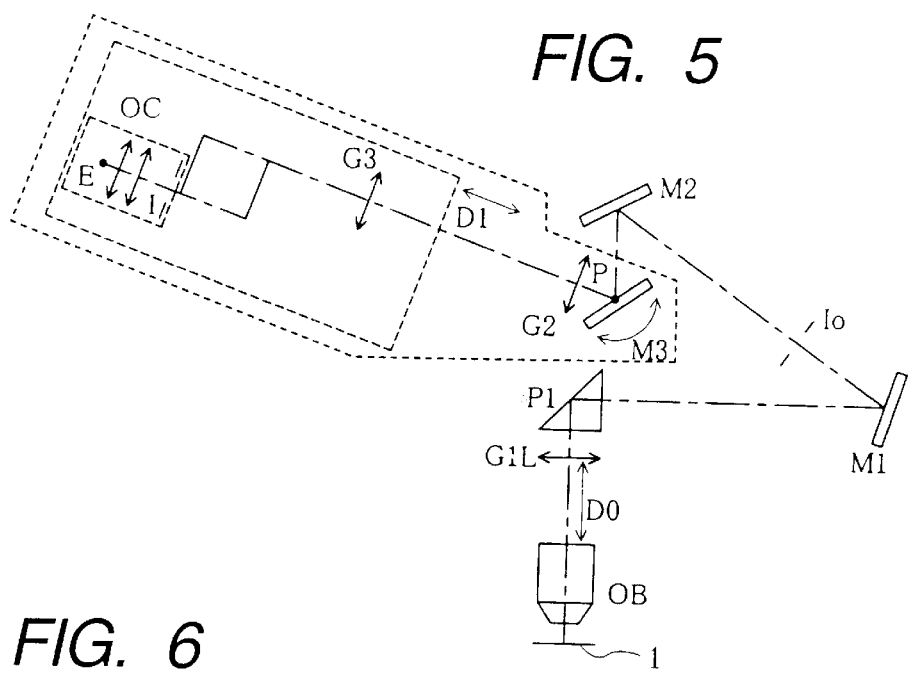
FIG. 5 shows the configuration of still another modification example of the second embodiment.

As in the modification examples shown in FIGS. 3, 4 and 5, the second embodiment can be variously modified. These modification examples differ from each other in the arrangement of the first optical system G1. To be specific, according to the FIG. 3 example, a prism P1, a deflecting mirror M1, deflecting prisms P2, P3 and the turnable deflecting mirror M2 form the deflecting members so that reflection occurs six times, to allow a correctly erected image to be observed. According to the FIG. 4 example, a deflecting prism P1', deflecting mirrors M1, M2 and a turnable deflecting mirror M3 form the deflecting members so that reflection occurs four times, to allow a correctly erected image to be observed. According to the FIG. 5 example, a prism P1, deflecting mirrors M1, M2 and a turnable deflecting mirror M3 form the deflecting members so that reflection occurs four times, to allow a correctly erected image to be observed. These modified examples are applicable to the first embodiment, as a matter of course.

Third Embodiment

In reference to FIG. 6, FIGS. 7A–7D, 8A–8E through 11A–11E, description will be made of the variable lens barrel according to the third embodiment of the present invention. According to this embodiment, the third optical system G3 comprises, in order from the side of the second optical system G2, a single meniscus lens unit L31 with a positive refracting power, a lens unit L32 with a negative refracting power, and a lens unit L33 with a positive refracting power including a single meniscus lens with a positive refracting power. Other structures, functions and effects are fundamentally similar to the second embodiment. According to the third embodiment, since the three lens-unit structure of the third optical system G3 allows the image position at the focal plane of the ocular OC to be close to the third optical system G3 even if the separation between the second optical system G2 and the third optical system G3 is shorter than the sum of the focal length F2 of the second optical system and the focal length F3 of the third optical system, the path length can be made short, to realize a compact lens barrel. As a result, the lens barrel is compatible with a conventional ocular in a microscope or the eclipse at the ocular can be prevented.

According to the above-mentioned configuration of the third optical system, as is understood from the paraxial amounts shown in the lens data below, even under the variable condition regarding the separation $D_0$ between the objective OB and the first optical system G1 and the separation $D_1$ between the second optical system G2 and the third optical system G3, change of the entrance pupil position on the objective side and the fluctuation of the exit pupil position are reduced while the path length in the binocular section for prism arrangement is secured, and the short amount of marginal off-axial rays and the eclipse can be prevented without increase in effective diameter of each lens in the third optical system G3 through the ocular OC.

The focal length F1 of the first optical system G1 is 180 mm, the focal length F2 of the second optical system G2 is 135.68 mm, the focal length F3 of the third optical system G3 is 135.68 mm, and the focal length F of the entire system is 180 mm. Since F1/F =1, the condition $0.7 \leq F1/F \leq 1.4$ is satisfied. Furthermore, since F3/F=0.75, the condition $0.5 \leq F3/F \leq 1$ also is satisfied.

Even if the separation $D_0$ between the objective OB and the first optical system G1, or the space for the intermediate lens barrel unit, and the separation $D_1$ between the second optical system G2 and the third optical system G3 are changed as shown in the exploded view of the path shown in FIGS. 7A–7D, the aberrations at the focal plane of the ocular OC are well compensated in either condition, as shown in the corresponding aberration diagrams. Therefore, observation is always facilitated by good optical performance even if the eyepoint position E is changed. The aberration diagrams shown in FIGS. 8A–8E, FIGS. 9A–9E, FIGS. 10A–10E, and FIGS. 11A–11E correspond to the conditions shown in FIG. 7A, FIG. 7B, FIG. 7C and FIG. 7D, respectively.

Figure 6:
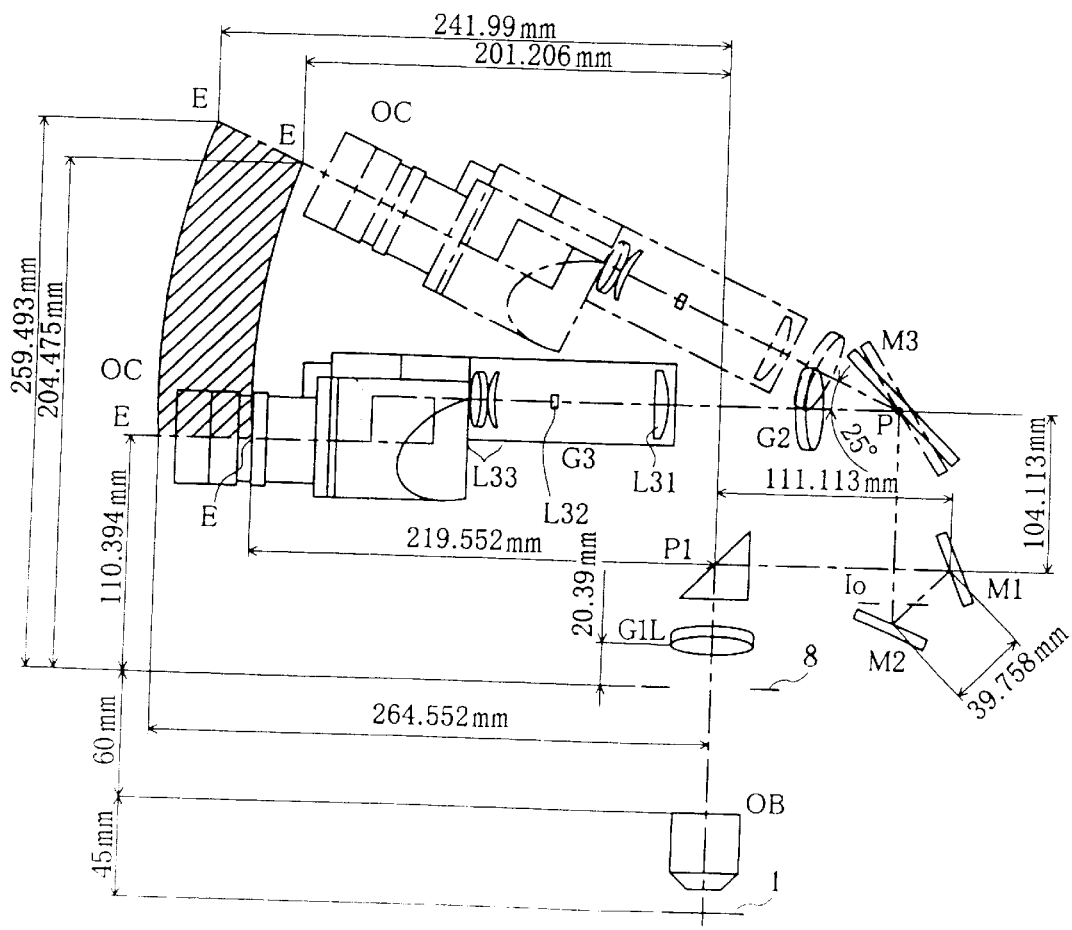
FIG. 6 shows the configuration of a variable lens barrel according to the third embodiment of the present invention.
Figure 7A:
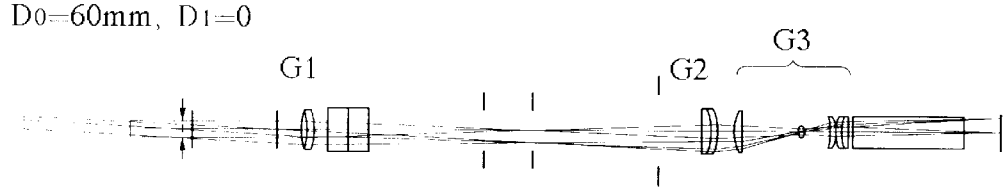
FIGS. 7A–7D are path diagrams in which the path of rays according to the third embodiment is schematically exploded linearly, where
Figure 7B:
Figure 7C:
Figure 7D:
Figure 12A:
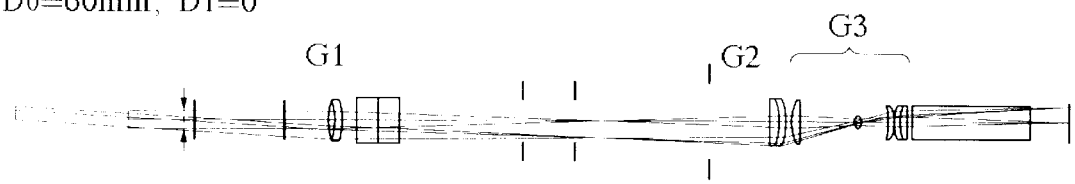
FIGS. 12A–12D are path diagrams in which the path of rays according to the fourth embodiment is schematically exploded linearly, where
Figure 12B:
Figure 12C:
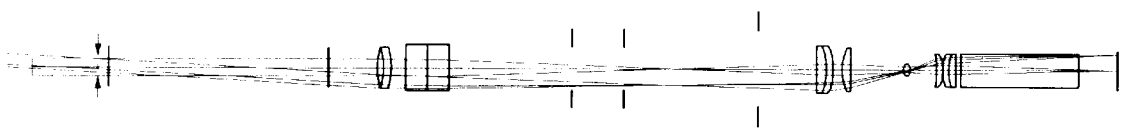
Figure 12D:
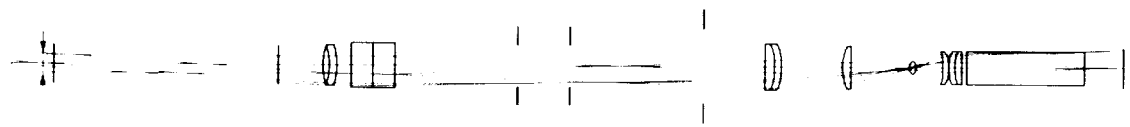
Figure 17A:
FIGS. 17A–17D are path diagrams in which the path of rays according to the fifth embodiment is schematically exploded linearly, where
Figure 17B:
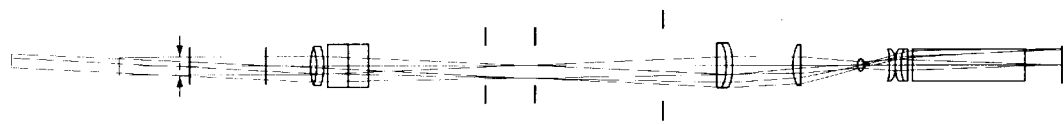
Figure 17C:
Figure 17D:
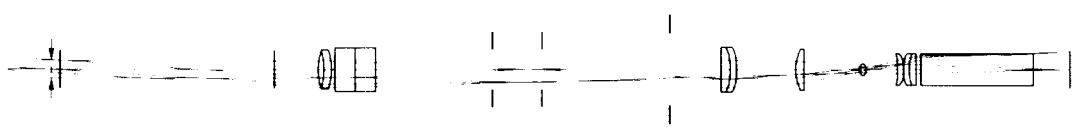
Figure 22:
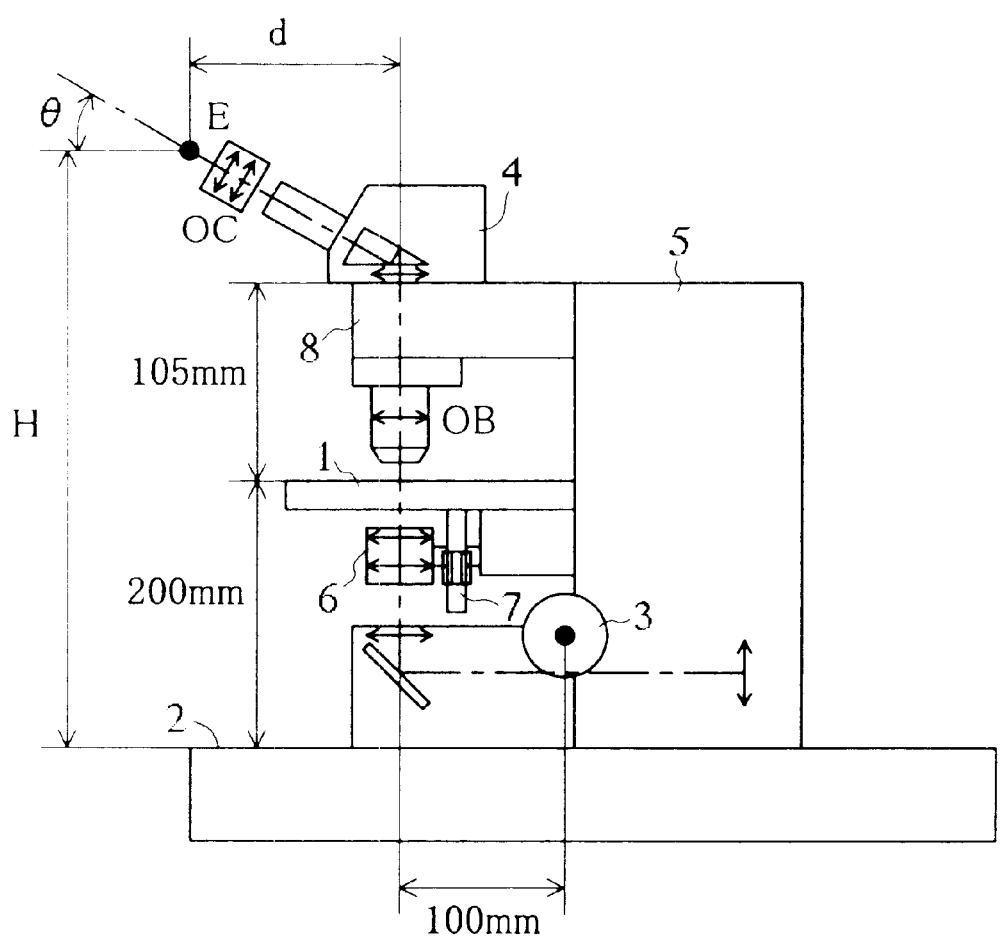
FIG. 22 is a schematic side view of an ordinary conventional microscope.

In the optical arrangement shown in FIG. 6, where $D_0=60$ mm, the depression angle θ is variable in the range from 0° (horizontal position) to 25° (position shown by the dot & dash line), the height of the eyepoint position E from the lens barrel side mount position 8 is in the range of 110.4 mm–259.5 mm, the height from the specimen surface 1 to the lens barrel side mount position 8 is 105 mm, the height from the desk top surface 2 (see FIG. 22) to the specimen surface 1 is 200 mm, the height H from the desk top surface 2 to the eyepoint position E is in the range of 415.4 mm–564.5 mm, and the horizontal distance d from the optical axis of the objective to the eyepoint position E is in the range of 201.2 mm–265 mm. Where $D_0=170$, the height from the desk top surface 2 to the lens barrel side mount position 8 is 415 mm, and the height H from the desk top surface 2 to the eyepoint position E is in the range of 525.4 mm–674.5 mm.

In this way, if the lens barrel of this embodiment is combined with an ordinary microscope, the height of the eyepoint position E from the desk top surface is variable approximately in the range of 410 mm–565 mm and the horizontal distance from the optical axis of the objective to the eyepoint position E is variable approximately in the range of 201 mm–265 mm because the eyepoint position E can be shifted substantially from the same position as with the conventional lens barrel by 45 mm along the center axis of the beam of rays emergent from the second optical system G2 away from the optical axis of the objective and the depression angle θ also is changeable. Therefore, variously built persons—from a short and small-built person to a tall and large-built person—can perform observation in an natural and relaxed posture. Furthermore, if an intermediate lens barrel unit or the like is combined, the height of the eyepoint position E can be further heightened by 110 mm, to achieve the maximum eyepoint height of 675 mm. As a result, both of the height of the eyepoint and the horizontal distance from the optical axis of the objective can be widened in reference to the eyepoint position of the conventional tilting lens barrel, and thus the microscope is well adaptable to a large-built person.

Also, the optical arrangement in the lens barrel may be any one of those shown in FIG. 3, FIG. 4 and FIG. 5 as long as the optical path length is kept constant. According to the configuration of the present embodiment, since the focal length F1 of the first optical system G1 equals to the focal length F of the entire system, a path dividing element such as a prism may be removably mounted between the first optical system G1 and the second optical system G2 for providing a photographing path. Also, in the configuration of FIG. 6, the deflecting mirror M1 may be configured to achieve removable mount or may be constructed with a half mirror, so as to introduce the intermediate image toward the photographing path.

The lens data and the optical paraxial amounts of the lens barrel according to the present embodiment are presented below. In the lens data, the surface arrangement number 0 corresponds to an imaginary object surface, not shown in FIGS. 7A–7D, indicating that the object is located at the infinite distance, the surface arrangement number 1 corresponds to the entrance pupil position of this optical system which appears at the leftmost position in FIGS. 7A–7D. The surfaces denoted by the subsequent surface arrangement numbers are shown in FIGS. 7A–7D in order from the left side. The surface arrangement number 3 corresponds to an imaginary surface indicating the mount position of the objective. The surface arrangement number 4 corresponds to the mount position of the lens barrel which supports this optical system. The surface arrangement numbers 4–6 correspond to the surfaces of the first lens unit G1L. The surface arrangement numbers 7–9 correspond to the surfaces of the prism P1, where the number 7 corresponds to an entrance surface, the number 8 corresponds to a reflecting surface, and the number 9 corresponds to an exit surface. The surface arrangement numbers 10–12 correspond to the mirrors M1, M2 and M3, respectively. The surface arrangement numbers 13–15 correspond to surfaces of the lens unit of the second optical system. The surface arrangement number 16 corresponds to an imaginary surface. In the third optical system, the surface arrangement numbers 17–18 correspond to the surfaces of the lens L31, the surface arrangement numbers 19–20 correspond to the surfaces of the lens L32, and the surface arrangement numbers 21–25 correspond to the surfaces of the lens unit L33. The surface arrangement numbers 26–27 correspond to the surfaces of the prism in the binocular section. The surface arrangement number 28 corresponds to the image position.

| | F1 = 180 mm | | | |
|---|---|---|---|---|
| Surface Arrange.No. | Radius of Curvature | Separation | Refractive Index (n) (587.56 nm) | Vd (Abbe's Number) |
| 0 (OBJ) | INF | INF | 1 | |
| 1 (ENP) | INF | 8 | 1 | |
| 2 (IMAGINARY) | INF | 60 | 1 | |
| 3 (IMAGINARY) | INF | 20.39 | 1 | |
| 4 | 146.7488 | 4 | 1.48749 | 70.23 |
| 5 | −64.4255 | 4.6 | 1.7495 | 35.28 |
| 6 | −118.8028 | 12.0681 | 1 | |
| 7 | INF | 17 | 1.51633 | 64.14 |
| 8 | INF | 17 | 1.51633 | 64.14 |
| 9 | INF | 94.1134 | 1 | |
| 10 (M1) | INF | 39.7582 | 1 | |
| 11 (M2) | INF | 104.1134 | 1 | |
| 12 (M3) | INF | 35.2444 | 1 | |
| 13 | 191.392 | 7.4 | 1.48749 | 70.23 |
| 14 | −42.135 | 4.05 | 1.72825 | 28.46 |
| 15 | −69.213 | 14.6 | 1 | |
| 16 (IMAGINARY) | INF | $D_1$ (variable) | 1 | |
| 17 | 38.939 | 5.4 | 1.48749 | 70.23 |
| 18 | 303.576 | 47.55 | 1 | |
| 19 | −17.507 | 1.8 | 1.64769 | 33.79 |
| 20 | 62.517 | 23.569 | 1 | |
| 21 | −48.734 | 3.7 | 1.6779 | 55.34 |
| 22 | −25.167 | 0.4 | 1 | |
| 23 | 63.383 | 3 | 1.7495 | 35.28 |
| 24 | 31.369 | 4.9 | 1.56384 | 60.67 |
| 25 | −130.265 | 3.93 | 1 | |
| 26 | INF | 91 | 1.56883 | 56.36 |
| 27 | INF | 29.6541 | | |
| 28 (IMG) | INF | 0 | | |

$D_1$ (variable): 0~45 mm vertex of the first lens unit G1L to the image surface: 568.85 mm

| Paraxial Amount | | | | | |
|---|---|---|---|---|---|
| $D_0$ | 60 | 60 | 170 | 170 | |
| $D_1$ | 0 | 45 | 0 | 45 | G1 alone |
| Entrance pupil radius | 7.2 | 7.2 | 7.2 | 7.2 | 7.2 |
| Image height | 11 | 11 | 11 | 11 | 11 |
| Focal length | 180 | 180 | 180 | 180 | 180 |
| Exit pupil position | −123.8 | −177.2 | −213 | −443.1 | −226 |
| Exit pupil radius | 4.9 | 7.1 | 8.5 | 17.7 | 14.8 |

Fourth Embodiment

The present embodiment has the optical arrangement similar to the third embodiment (see FIG. 6), but differs in that the focal length F1 of the first optical system G1 is configured to be longer than the focal length F of the entire system. According to this embodiment, the focal length F1 of the first optical system G1 is 215 mm, the focal length F2 of the second optical system is 115.4 mm, the focal length F3 of the third optical system G3 is 96.62 mm, and the focal length F of the entire system is 180 mm, Since F1/F=1.19, the condition $0.7 \leq F1/F \leq 1.4$ is satisfied. Furthermore, since F3/F=0.54, the condition $0.5 \leq F3/F \leq 1$ also is satisfied.

According to the present embodiment, as in the case of the third embodiment, even if the separation $D_0$ between the objective OB and the first optical system G1, or the space for the intermediate lens barrel unit, and the separation $D_1$ between the second optical system G2 and the third optical system G3 are changed as shown in the exploded view of the path shown in FIGS. 12A–12D, the aberrations at the focal plane of the ocular OC are well compensated in either condition, as shown in the corresponding aberration diagrams. Also, the present embodiment is good at system compatibility.

The aberration diagrams shown in FIGS. 13A–13E, FIGS. 14A–14E, FIGS. 15A–15E, and FIGS. 16A–16E correspond to the conditions shown in FIG. 12A, FIG. 12B, FIG. 12C and FIG. 12D, respectively. Also, as is obvious from the lens data below, the optical path length of the entire lens barrel optical system is substantially the same as in the case of the third embodiment, and thus application of the layout similar to the third embodiment allows variously built observers to take a natural posture. Also, the layout shown in any one of FIG. 3. FIG. 4, FIG. 5 is applicable to the fourth embodiment, as a matter of course.

The lens data and the optical paraxial amounts of the lens barrel according to the present embodiment are presented below. Correspondence of the surface arrangement numbers to the surfaces is the same as the third embodiment, and thus explanation about them is omitted.

vertex of the first lens unit G1L to the image surface: 574.99 mm

| Paraxial Amount | | | | | |
|---|---|---|---|---|---|
| $D_0$ | 60 | 60 | 170 | 170 | |
| $D_1$ | 0 | 45 | 0 | 45 | G1 alone |
| Entrance pupil radius | 7.2 | 7.2 | 7.2 | 7.2 | 7.2 |
| Image height | 11 | 11 | 11 | 11 | 11 |
| Focal length | 180 | 180 | 180 | 180 | 215 |
| Exit pupil position | −112.5 | −245.6 | −181.9 | −1478.4 | −240 |
| Exit pupil radius | 4.5 | 9.8 | 7.3 | 59.1 | 13.9 |

Fifth Embodiment

The present embodiment has the optical arrangement similar to the third embodiment (see FIG. 6), but differs from the third or fourth embodiment in that the focal length F1 of the first optical system G1 is configured to be shorter than the focal length F of the entire system. According to this embodiment, the focal length F1 of the first optical system G1 is 160 mm, the focal length F2 of the second optical system is 153.16 mm, the focal length F3 of the third optical system G3 is 172.3 mm, and the focal length F of the entire system is 180 mm, Since F1/F=0.89, the condition $0.7 \leq F1/F \leq 1.4$ is satisfied. Furthermore, since F3/F=0.957, the condition $0.5 \leq F3/F \leq 1$ also is satisfied.

According to the present embodiment, as in the case of the third embodiment, even if the separation $D_0$ between the objective OB and the first optical system G1, or the space for the intermediate lens barrel unit, and the separation $D_1$ between the second optical system G2 and the third optical system G3 are changed as shown in the exploded view of the path shown in FIGS. 17A–17D, the aberrations at the focal

| | | F1 = 215 mm | | |
|---|---|---|---|---|
| Surface Arrange.No. | Radius of Curvature | Separation | Refractive Index (n) (587.56 nm) | Vd (Abbe's Number) |
| 0 (OBJ) | INF | INF | 1 | |
| 1 (ENT) | INF | 8 | 1 | |
| 2 (IMAGINARY) | INF | 60 | 1 | |
| 3 (IMAGINARY) | INF | 35 | 1 | |
| 4 | 93.526 | 7.3 | 1.48749 | 70.23 |
| 5 | −118.961 | 5.95 | 1.7495 | 35.28 |
| 6 | −455.864 | 9.869 | 1 | |
| 7 | INF | 17 | 1.51633 | 64.14 |
| 8 | INF | 17 | 1.51633 | 64.14 |
| 9 | INF | 94.1134 | 1 | |
| 10 (M1) | INF | 39.7582 | 1 | |
| 11 (M2) | INF | 104.1134 | 1 | |
| 12 (M3) | INF | 46.9336 | 1 | |
| 13 | 125.461 | 7.4 | 1.48749 | 70.23 |
| 14 | −50.486 | 4.05 | 1.72825 | 28.46 |
| 15 | −75.666 | 6.312 | 1 | |
| 16 (IMAGINARY) | INF | $D_1$ (variable) | 1 | |
| 17 | 41.531 | 5.4 | 1.48749 | 70.23 |
| 18 | 194.44 | 46.9843 | 1 | |
| 19 | −18.936 | 1.9 | 1.6727 | 32.1 |
| 20 | 41.156 | 23.4596 | 1 | |
| 21 | −114.12 | 4 | 1.788 | 47.37 |
| 22 | −28.387 | 0.4 | 1 | |
| 23 | 62.323 | 3 | 1.7495 | 35.28 |
| 24 | 26.871 | 5.25 | 1.48749 | 70.23 |
| 25 | −106.711 | 3.7951 | 1 | |
| 26 | INF | 91 | 1.56883 | 56.36 |
| 27 | INF | 30 | 1 | |
| 28 (IMG) | INF | 0 | | |

$D_1$ (variable): 0~45 mm plane of the ocular OC are well compensated in either condition, as shown in the corresponding aberration diagrams. Also, the present embodiment is good at system compatibility.

The aberration diagrams shown in FIGS. 18A–18E, FIGS. 19A–19E, FIGS. 20A–20E, and FIGS. 21A–21E correspond to the conditions shown in FIG. 17A, FIG. 17B, FIG. 17C and FIG. 17D, respectively. Also, as is obvious from the lens data below, the optical path length of the entire lens barrel optical system is substantially the same as in the case of the third embodiment, and thus application of the layout similar to the third embodiment allows variously built observers to take a natural posture. Also, the layout shown in any one of FIG. 3, FIG. 4, FIG. 5 is applicable to the fifth embodiment, as a matter of course.

The lens data and the optical paraxial amounts of the lens barrel according to the present embodiment are presented below. Correspondence of the surface arrangement numbers to the surfaces is the same as the third embodiment, and thus explanation about them is omitted.

-continued

| Exit pupil position | −120 | −146.7 | −202.2 | −292.2 | −356.2 |
| Exit pupil radius | 4.8 | 5.9 | 8.1 | 11.7 | 22 |

In the aberration diagrams of the third to fifth embodiments, the broken line presents aberration performance at the wavelength of 435.84 nm, the single dot and dash line presents aberration performance at the wavelength of 486.13 nm, the dotted line presents aberration performance at the wavelength of 656.27 nm, and the solid line presents aberration performance at the wavelength of 587.56 nm.

As described above, the present invention is able to provide a variable lens barrel which can change the eyepoint position by a large amount in comparison with the conventional lens barrel or a tilting lens barrel, to allow variously-built persons,—from tall persons to small-built persons—to perform observation in a natural and relaxed posture and thus which is effective in relieving fatigue, and which is favorable in view of system compatibility with an intermediate lens barrel unit or the like. The present invention is able to provide a microscope using this variable lens barrel, also.

What is claimed is:

1. A lens barrel comprising, in order from a light incident side:
   a first optical system;
   a second optical system which converts a beam of rays emergent from said first optical system into a beam of parallel rays;
   a third optical system which introduces the beam of parallel rays emergent from said second optical system into an ocular;

F1 = 160 mm

| Surface Arrange.No. | Radius of Curvature | Separation | Refractive Index (n) (587.56 nm) | Vd (Abbe's Number) |
|---|---|---|---|---|
| 0 (OBJ) | INF | INF | 1 | |
| 1 (ENT) | INF | 8 | 1 | |
| 2 (IMAGINARY) | INF | 60 | 1 | |
| 3 (IMAGINARY) | INF | 35 | 1 | |
| 4 | 143.034 | 5 | 1.48749 | 70.23 |
| 5 | −58.001 | 4.4 | 1.7495 | 35.28 |
| 6 | −101.666 | 4.3529 | 1 | |
| 7 | INF | 17 | 1.51633 | 64.14 |
| 8 | INF | 17 | 1.51633 | 64.14 |
| 9 | INF | 94.1134 | 1 | |
| 10 (M1) | INF | 39.7582 | 1 | |
| 11 (M2) | INF | 104.1134 | 1 | |
| 12 (M3) | INF | 41.4164 | 1 | |
| 13 | 156.798 | 7.4 | 1.48749 | 70.23 |
| 14 | −50.373 | 4 | 1.72151 | 29.23 |
| 15 | −89.166 | 6.1626 | 1 | |
| 16 (IMAGINARY) | INF | $D_1$ (variable) | 1 | |
| 17 | 39.608 | 5.4 | 1.48749 | 70.23 |
| 18 | 346.666 | 47.7192 | 1 | |
| 19 | −19.962 | 2.35 | 1.6727 | 32.1 |
| 20 | 599.477 | 24.309 | 1 | |
| 21 | −61.53 | 3.8 | 1.6779 | 55.34 |
| 22 | −32.636 | 0.4 | 1 | |
| 23 | 518.19 | 3.95 | 1.6393 | 44.87 |
| 24 | 32.11 | 6.1 | 1.57135 | 52.95 |
| 25 | −67.13 | 6.5109 | 1 | |
| 26 | INF | 91 | 1.56883 | 56.36 |
| 27 | INF | 30 | 1 | |
| 28 (IMG) | INF | 0 | | |

$D_1$ (variable): 0~45 mm vertex of the first lens unit G1L to the image surface: 566.25 mm Paraxial Amount

| | | | | | |
|---|---|---|---|---|---|
| $D_0$ | 60 | 60 | 170 | 170 | |
| $D_1$ | 0 | 45 | 0 | 45 | G1 alone |
| Entrance pupil radius | 7.2 | 7.2 | 7.2 | 7.2 | 7.2 |
| Image height | 11 | 11 | 11 | 11 | 11 |
| Focal length | 180 | 180 | 180 | 180 | 160 | wherein said first optical system comprises a lens unit which forms an intermediate image and at least three light deflecting members which deflect the beam of rays, wherein said second optical system comprises a lens unit and a light deflecting member, and wherein said light deflecting member of said second optical system is constructed an arranged to turn around an axis that is perpendicular to a first optical axis and to a second optical axis, where a center axis of the beam of rays emergent from a most second optical system-side one of said light deflecting members of said first optical system in optical arrangement is defined as the first optical axis, and a center axis of the beam of parallel rays emergent from said second optical system is defined as the second optical axis.

2. A lens barrel comprising, in order from a light incident side:

a first optical system;

a second optical system which converts a beam of rays emergent from said first optical system into a beam of parallel rays; and a third optical system which introduces the beam of parallel rays emergent from said second optical system into an ocular, wherein said first optical system comprises a lens unit which forms an intermediate image and at least four light deflecting members which deflect the beam of rays, and wherein a separation between said second optical system and said third optical system is variable in a direction along a center axis of the beam of rays emergent from said second optical system.

3. A lens barrel according to claim 1, wherein said lens barrel is constructed and arranged so that, when said light deflecting member of said second optical system is turned by an angle of α, a rear section of said second optical system disposed behind said light deflecting member of said second optical system, said third optical system and the ocular are integrally revolved by an angle of 2α.

4. A lens barrel according to claim 3, wherein said lens barrel is constructed and arranged so that a separation between said second optical system and said third optical system is variable in a direction along the second optical axis.

5. A lens barrel according to claim 2 or 4, wherein said third optical system comprises, in order from a side of said second optical system, a lens unit (L31) having a positive refracting power, a lens unit (L32) having a negative refracting power, and a lens unit (L33) having a positive refracting power.

6. A lens barrel according to claim 5, wherein said lens unit (L31) comprises at least one positive meniscus lens which directs a concave surface thereof toward said lens unit (L32), and said lens unit (L33) comprises at least one positive meniscus lens which directs a concave surface thereof toward said lens unit (L32).

7. A lens barrel according to claim 2 or 4, wherein the following condition is satisfied:

$$0.7 \leq F1/F \leq 1.4$$

where F1 is a focal length of said first optical system and F is a focal length of an entire system including said first optical system through said third optical system.

8. A lens barrel according to claim 7, wherein the following condition is further satisfied:

$$0.5 \leq F3/F \leq 1$$

where F3 is a focal length of said third optical system.

9. A microscope provided with a lens barrel, said lens barrel comprising, in order from a light incident side:

a first optical system;

a second optical system which converts a beam of rays emergent from said first optical system into a beam of parallel rays; and a third optical system which introduces the beam of parallel rays emergent from said second optical system into an ocular;

wherein said first optical system comprises a lens unit which forms an intermediate image and at least three light deflecting members which deflect the beam of rays, wherein said second optical system comprises a lens unit and a light deflecting member, and wherein said light deflecting member of said second optical system is constructed an arranged to turn around an axis that is perpendicular to a first optical axis and to a second optical axis, where a center axis of the beam of rays emergent from a most second optical system-side one of said light deflecting members of said first optical system in optical arrangement is defined as the first optical axis, and a center axis of the beam of parallel rays emergent from said second optical system is defined as the second optical axis.

10. A microscope provided with a lens barrel, said lens barrel comprising, in order from a light incident side:

a first optical system;

a second optical system which converts a beam of rays emergent from said first optical system into a beam of parallel rays; and a third optical system which introduces the beam of parallel rays emergent from said second optical system into an ocular, wherein said first optical system comprises a lens unit which forms an intermediate image and at least four light deflecting members which deflect the beam of rays, and wherein a separation between said second optical system and said third optical system is variable in a direction along a center axis of the beam of rays emergent from said second optical system.

11. A microscope according to claim 9, wherein said lens barrel is constructed and arranged so that, when said light deflecting member of said second optical system is turned by an angle of α, a rear section of said second optical system disposed behind said light deflecting member of said second optical system, said third optical system and the ocular are integrally revolved by an angle of 2α.

12. A microscope according to claim 11, wherein said lens barrel is constructed and arranged so that a separation between said second optical system and said third optical system is variable in a direction along the second optical axis.

13. A microscope according to claim 10 or 12, wherein said third optical system comprises, in order from a side of said second optical system, a lens unit (L31) having a positive refracting power, a lens unit (L32) having a negative refracting power, and a lens unit (L33) having a positive refracting power.

14. A microscope according to claim 13, wherein said lens unit (L31) comprises at least one positive meniscus lens which directs a concave surface thereof toward said lens unit (L32), and said lens unit (L33) comprises at least one positive meniscus lens which directs a concave surface thereof toward said lens unit (L32).

15. A microscope according to claim 10 or 12, wherein the following condition is satisfied:

$$0.7 \leq F1/F \leq 1.4$$

where F1 is a focal length of said first optical system and F is a focal length of an entire system including said first optical system through said third optical system.

16. A microscope according to claim 15, wherein the following condition is further satisfied:

$$0.5 \leq F3/F \leq 1$$

where F3 is a focal length of said third optical system.

* * * * *